United States Patent
Nory et al.

(10) Patent No.: US 12,219,558 B2
(45) Date of Patent: Feb. 4, 2025

(54) TRANSITIONING BETWEEN DIFFERENT SCHEDULING DELAY ASSUMPTIONS

(71) Applicant: TELEFONAKTIEBOLAGET LM ERICSSON (PUBL), Stockholm (SE)

(72) Inventors: Ravikiran Nory, San José, CA (US); Ajit Nimbalker, Fremont, CA (US); Havish Koorapaty, Saratoga, CA (US); Andres Reial, Lomma (SE); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 707 days.

(21) Appl. No.: 17/281,184

(22) PCT Filed: Sep. 28, 2019

(86) PCT No.: PCT/IB2019/058257
§ 371 (c)(1),
(2) Date: Mar. 29, 2021

(87) PCT Pub. No.: WO2020/065624
PCT Pub. Date: Apr. 2, 2020

(65) Prior Publication Data
US 2021/0400699 A1   Dec. 23, 2021

Related U.S. Application Data

(60) Provisional application No. 62/738,742, filed on Sep. 28, 2018.

(51) Int. Cl.
H04W 72/1273 (2023.01)
H04L 1/1812 (2023.01)
(Continued)

(52) U.S. Cl.
CPC ....... H04W 72/1273 (2013.01); H04L 1/1819 (2013.01); H04L 1/1896 (2013.01);
(Continued)

(58) Field of Classification Search
CPC . H04W 72/1273; H04W 72/23; H04W 24/08; H04W 72/0446; H04L 1/1819; H04L 1/1896
See application file for complete search history.

(56) References Cited

U.S. PATENT DOCUMENTS

2006/0034285 A1   2/2006   Pirskanen et al.
2006/0056355 A1   3/2006   Love et al.
(Continued)

FOREIGN PATENT DOCUMENTS

AU   2017436886 A1 *   5/2020   ....... H04L 27/26025
CO   06122135   11/2007
(Continued)

OTHER PUBLICATIONS

Ericsson: "Adaptation aspects of NR UE power saving", 3GPP TSG-RAN WG1 Meeting AH-1901, Tdoc R1-1901166, Taipei, Taiwan, Jan. 21-25, 2019.
(Continued)

*Primary Examiner* — Michael J Moore, Jr.

(57) ABSTRACT

Systems and methods are disclosed herein for transitioning between different scheduling delay assumptions. In some embodiments, a method performed by a wireless device comprises monitoring, during a first slot, for a downlink control channel comprising downlink control information that schedules a transmission for the wireless device with an assumption of a first scheduling delay that is equal to or exceeds a first value. The method further comprises determining that the wireless device is to switch from the assumption of the first scheduling delay to an assumption of
(Continued)

a second scheduling delay that is equal to or exceeds a second value that is less than the first value. The method further comprises monitoring, during one or more later slots that occur after the first slot, for a downlink control channel comprising downlink control information that schedules a transmission for the wireless device with the assumption of the second scheduling delay.

34 Claims, 20 Drawing Sheets

(51) Int. Cl.
  *H04L 1/1867* (2023.01)
  *H04W 24/08* (2009.01)
  *H04W 72/0446* (2023.01)
  *H04W 72/23* (2023.01)
(52) U.S. Cl.
  CPC ....... *H04W 24/08* (2013.01); *H04W 72/0446* (2013.01); *H04W 72/23* (2023.01)

(56) References Cited

U.S. PATENT DOCUMENTS

| | | | |
|---|---|---|---|
| 2007/0106924 | A1 | 5/2007 | Seidel et al. |
| 2008/0095116 | A1 | 4/2008 | Kim et al. |
| 2012/0106510 | A1 | 5/2012 | Kuo |
| 2012/0275364 | A1 | 11/2012 | Anderson et al. |
| 2014/0050186 | A1 | 2/2014 | Kim et al. |
| 2015/0085720 | A1 | 3/2015 | Gaal et al. |
| 2015/0230173 | A1 | 8/2015 | Li et al. |
| 2016/0119948 | A1 | 4/2016 | Damnjanovic et al. |
| 2016/0330659 | A1 | 11/2016 | Zhu et al. |
| 2017/0142700 | A1 | 5/2017 | Pan et al. |
| 2018/0020365 | A1 | 1/2018 | Xiong et al. |
| 2018/0077722 | A1 | 3/2018 | Awad et al. |
| 2018/0145800 | A1 | 5/2018 | Srivastav et al. |
| 2018/0242319 | A1 | 8/2018 | Akkarakaran et al. |
| 2019/0098689 | A1 | 3/2019 | Wei et al. |
| 2019/0312635 | A1* | 10/2019 | Ang ...................... H04L 5/0007 |
| 2020/0037245 | A1* | 1/2020 | Lu ......................... H04W 72/23 |
| 2020/0052830 | A1 | 2/2020 | Liu et al. |
| 2020/0053755 | A1* | 2/2020 | Ang .................. H04W 72/0446 |
| 2020/0077432 | A1* | 3/2020 | Xiong ................... H04L 5/0092 |
| 2020/0107345 | A1* | 4/2020 | Ang ...................... H04L 1/0026 |
| 2020/0288479 | A1* | 9/2020 | Xi .......................... H04L 5/0094 |
| 2021/0076445 | A1* | 3/2021 | Tsai ................... H04W 74/0833 |
| 2021/0219328 | A1* | 7/2021 | Xiong .................... H04W 72/21 |
| 2021/0259044 | A1 | 8/2021 | Islam et al. |
| 2021/0306824 | A1* | 9/2021 | Li ........................... H04W 4/40 |
| 2021/0314866 | A1* | 10/2021 | Lee .................... H04W 52/0229 |
| 2021/0360674 | A1 | 11/2021 | Lim et al. |
| 2021/0400699 | A1* | 12/2021 | Nory ................. H04W 72/0446 |
| 2022/0039009 | A1* | 2/2022 | Iyer ...................... H04L 5/0098 |
| 2022/0053540 | A1 | 2/2022 | Takeda et al. |
| 2022/0104122 | A1* | 3/2022 | Maleki ................ H04W 52/028 |
| 2022/0159700 | A1* | 5/2022 | Maleki ................... H04W 72/23 |
| 2022/0167193 | A1* | 5/2022 | Kim ...................... H04W 72/044 |
| 2022/0346068 | A1* | 10/2022 | Nimbalker ........ H04W 72/0446 |
| 2023/0097818 | A1* | 3/2023 | Maleki .............. H04W 52/0232 |
| | | | 455/574 |

FOREIGN PATENT DOCUMENTS

| | | | | |
|---|---|---|---|---|
| NO | 2020064710 | A1 | 4/2020 | |
| WO | 2017218749 | A1 | 12/2017 | |
| WO | WO-2018133754 | A1 * | 7/2018 | ........... H04L 1/1642 |
| WO | 2020064770 | A1 | 4/2020 | |

OTHER PUBLICATIONS

Ericsson, "Power consumption reduction for paging and connected-mode DRX for NB-IoT", 3GPP TSG-RAN WG1 Meeting #90, R1-1712621, Prague, Czech Republic, Aug. 21-25, 2017.

Qualcomm Incorporated, "Remaining Issues on DL/UL Resource Allocation", 3GPP TSG-RAN WG1 Meeting #93, May 21-25, 2018, Busan, Korea.

Qualcomm Incorporated, "UE Power Saving during Active State", 3GPP TSG RAN WG2 NR #99bis, R2-1711904 (Revision of R2-1709117), Oct. 9-13, 2017, Prague, Czech.

Qualcomm Incorporated, "Views on UE power saving", 3GPP TSG RAN WG1 Meeting #94, R1-1809462, Aug. 20-24, 2018, Gothenburg, Sweden.

CATT, "NR DRX Design", 3GPP TSG-RAN WG2 Meeting #97, R2-1700972, Athens, Greece, Feb. 13-17, 2017, pp. 1-4.

Huawei et al., "Design Considerations for UE Power Saving", 3GPP TSG RAN WG1 Meeting #93, R1-1807306, Busan, Korea, May 21-25, 2018, pp. 1-4.

Intel Corporation, "Dynamic C-DRX Configuration in NR", 3GPP TSG RAN WG2 Meeting #97, Athens, Greece, R2-1701722, Feb. 13, 2017, pp. 1-3.

Qualcomm Incorporated, "Discussion on DCI Related Issues", 3GPP TSG RAN WG1 Meeting #92, Athens, R1-1802836, Greece, Feb. 26-Mar. 2, 2018, pp. 1-4.

Samsung, "On UE Power Savings" 3GPP TSG RAN WG1 Meeting #92, R1-1801977, Athens, Greece, 26 Feb.-Mar. 2, 2018, pp. 1-5.

VIVO, "NR UE Power Saving", 3GPP TSG RAN WG1 Meeting #93, R1-1806091, Busan, Korea, May 21-25, 2018, pp. 1-5.

Qualcomm Incorporated, "UE Power Saving during Active State", 3GPP TSG RAN WG2 NR #99bis, R2-1711904 (Revision of R2-1709117), Prague, Czech, Oct. 9-13, 2017.

Qualcomm Incorporated, "Remaining Issues on DL/UL Resource Allocation", 3GPP TSG-RAN WG1 Meeting #93, R1-1807363, May 21-25, 2018, Busan, Korea.

Qualcomm Incorporated, "Remaining Issues on DL/UL Resource Allocation", 3GPP TSG-RAN WG1 Meeting #93, R1-1807652, May 21-25, 2018, Busan, Korea.

* cited by examiner

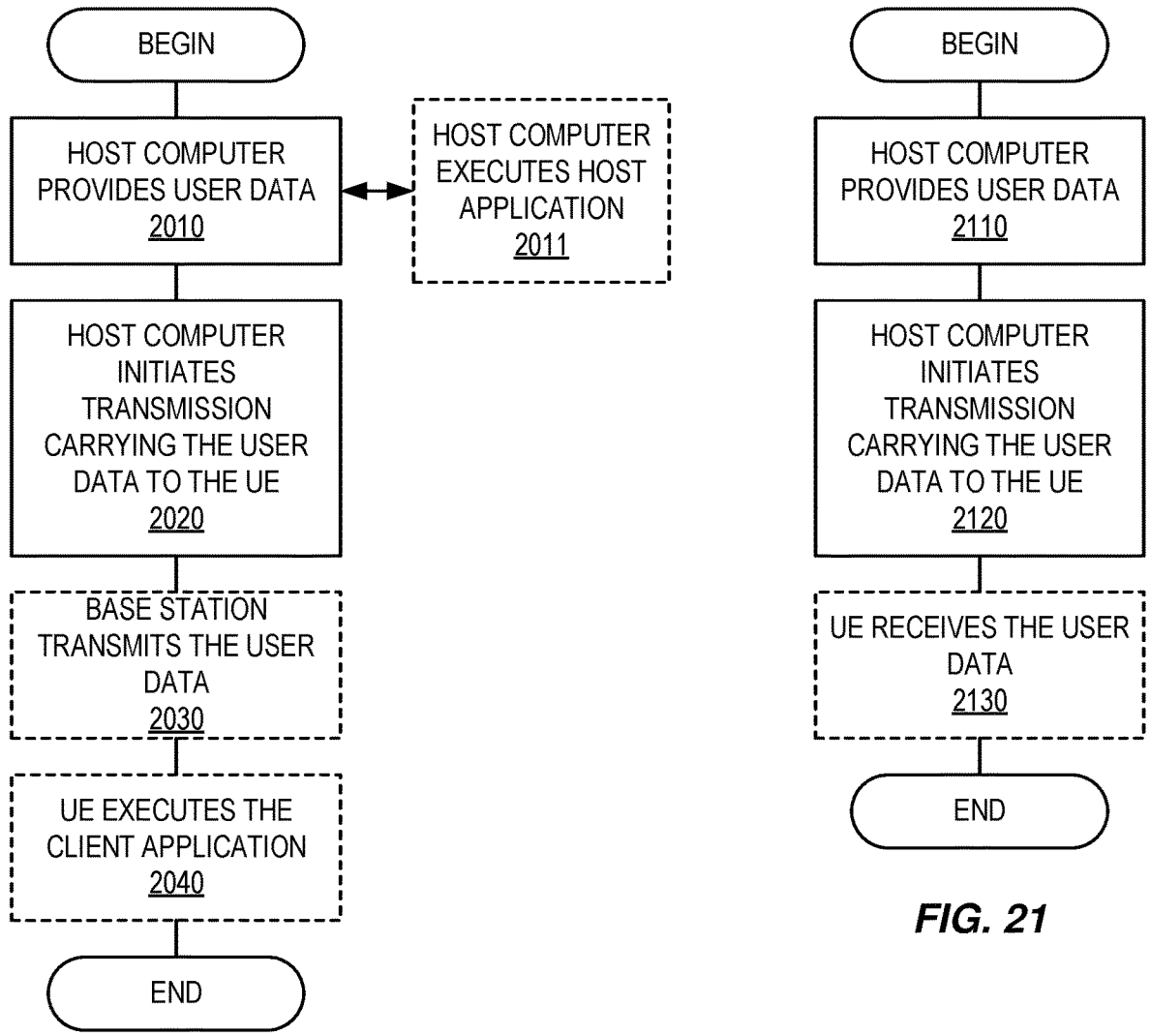

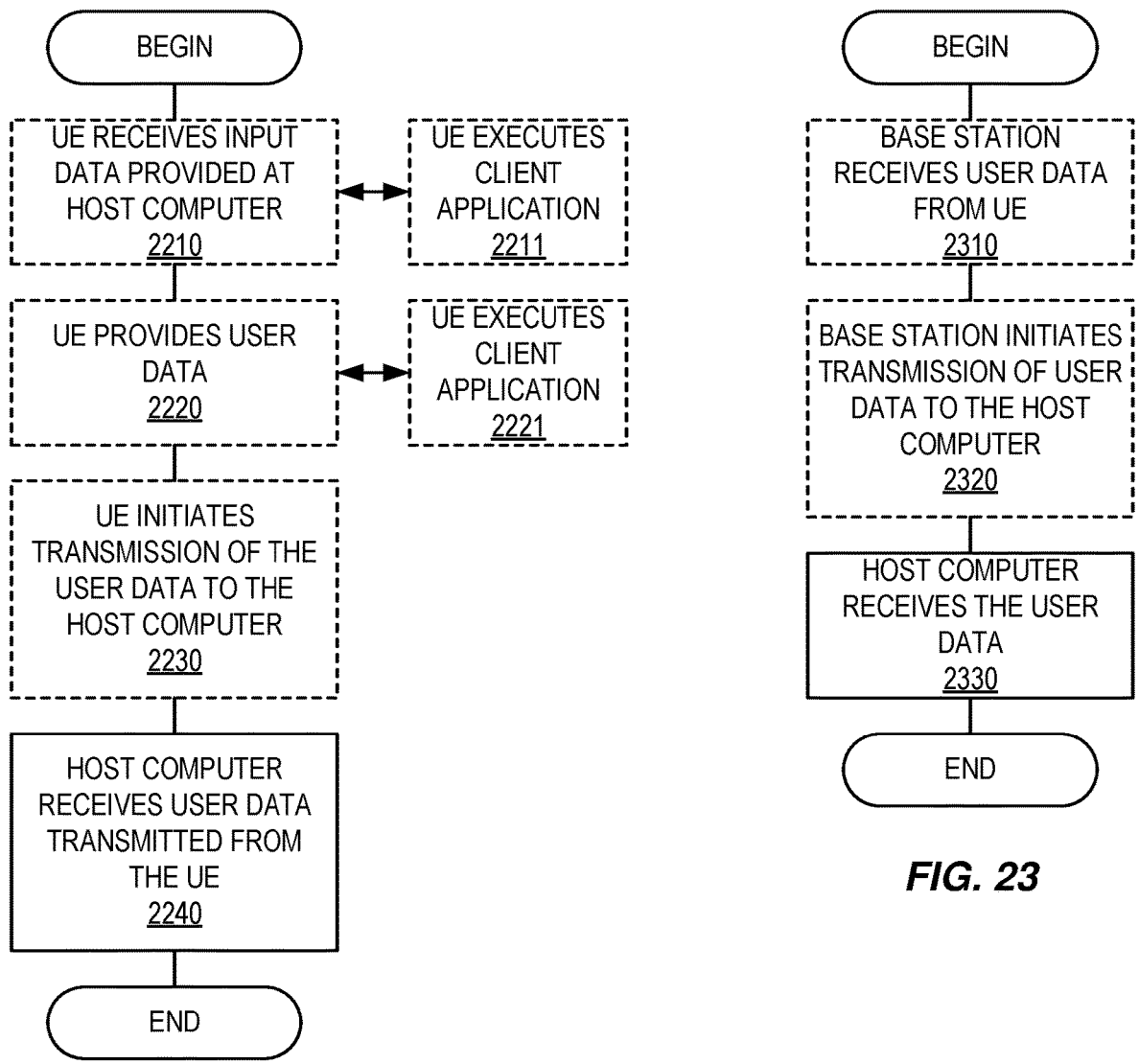

TRANSITIONING BETWEEN DIFFERENT SCHEDULING DELAY ASSUMPTIONS

RELATED APPLICATIONS

This application is a national stage application of International Patent Application No. PCT/IB2019/058257 filed on Sep. 28, 2019, which claims the benefit of U.S. Provisional Patent Application No. 62/738,742, filed Sep. 28, 2018, the disclosures of which are hereby incorporated herein by reference in their entirety.

TECHNICAL FIELD

The present disclosure relates to a wireless communication system and, in particular, to cross-slot scheduling in a wireless communication system.

BACKGROUND

Third Generation Partnership Project (3GPP) Fifth Generation (5G) New Radio (NR) includes services such as enhanced Mobile Broadband (eMBB), Ultra Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission while being more accepting of moderate data rates.

One of the solutions for low latency data transmission is shorter transmission time intervals. In addition to transmission in a slot, NR includes a mini-slot transmission to reduce latency. A mini-slot may consist of any number of 1 to 14 Orthogonal Frequency Division Multiplexing (OFDM) symbols. The concepts of slot and mini-slot are not specific to a specific service, meaning that a mini-slot may be used for either eMBB, URLLC, or other services. FIG. 1 illustrates an exemplary radio resource in NR.

User Equipment (UE) power consumption is an important metric that needs to be enhanced. In general, significant power can be spent on monitoring the Physical Downlink Control Channel (PDCCH) in Long Term Evolution (LTE) based on one Discontinuous Reception (DRX) setting from LTE field logs. If similar DRX settings with traffic modelling are used, NR is similar because the UE needs to perform blind detection in its configured Control Resource Sets (CORESETs) to identify whether there is a PDCCH sent to the UE. Techniques that can reduce unnecessary PDCCH monitoring or enable a UE to go to sleep or wake-up only when required can be beneficial.

In 3GPP 5G NR, a UE can be configured with up to four carrier Bandwidth Parts (BWPs) in the downlink with a single downlink carrier bandwidth part being active at a given time. A UE can be configured with up to four carrier BWPs in the uplink with a single uplink carrier BWP being active at a given time. If a UE is configured with a supplementary uplink, the UE can additionally be configured with up to four carrier BWPs in the supplementary uplink with a single supplementary uplink carrier BWP being active at a given time.

For a carrier BWP with a given numerology $\mu_i$, a contiguous set of Physical Resource Blocks (PRBs) are defined and numbered from 0 to $N_{BWP_i}^{size}-1$, where i is the index of the carrier BWP. A Resource Block (RB) is defined as twelve (12) consecutive subcarriers in the frequency domain.

Multiple OFDM numerologies, $\mu$, are supported in NR, as given by Table 1 below, where the subcarrier spacing, $\Delta f$, and the cyclic prefix for a carrier BWP are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. Downlink physical channels include Physical Downlink Shared Channel (PDSCH), Physical Broadcast Channel (PBCH), and PDCCH. PDSCH is the main physical channel used for unicast downlink data transmission, but is also used for transmission of Random Access Response (RAR), certain system information blocks, and paging information. PBCH carries basic system information required by the UE to access the network. PDCCH is used for transmitting Downlink Control Information (DCI), mainly scheduling decisions, required for reception of PDSCH, and for uplink scheduling grants enabling transmission on a Physical Uplink Shared Channel (PUSCH).

An uplink physical channel corresponds to a set of resource elements carrying information originating from higher layers. Uplink physical channels include PUSCH, Physical Uplink Control Channel (PUCCH), and Physical Random Access Channel (PRACH). PUSCH is the uplink counterpart to the PDSCH. PUCCH is used by UEs to transmit uplink control information, including Hybrid Automatic Repeat Request (HARQ) acknowledgements, channel state information reports, etc. PRACH is used for random access preamble transmission.

Example contents of a DL DCI 1_0 (i.e., DCI format 1_0) are shown below. The Cyclic Redundancy Check (CRC) is scrambled by a Cell Radio Network Temporary Identifier (C-RNTI) or Configured Scheduling Radio Network Temporary Identifier (CS-RNTI). Example contents of a DL DCI 1_0 are:

Identifier for DCI formats—1 bit: The value of this bit field is always set to 1, indicating a DL DCI format;

Frequency domain resource assignment—$\lceil \log_2(N_{RB}^{DL,BWP}(N_{RB}^{DL,BWP}+1)/2)\rceil$ bits: $N_{RB}^{DL,BWP}$ is the size of the active DL BWP in case DCI format 1_0 is monitored in the UE specific search space and satisfying the total number of different DCI sizes configured to monitor is no more than four (4) for the cell, and the total number of different DCI sizes with C-RNTI configured to monitor is no more than three (3) for the cell, otherwise, $N_{RB}^{DL,BWP}$ is the size of CORESET 0.

Time domain resource assignment—four (4) bits as defined in Subclause 5.1.2.1 of 3GPP Technical Specification (TS) 38.214;

Virtual Resource Block (VRB)-to-PRB mapping—one (1) bit according to Table 7.3.1.1.2-33 of 3GPP TS 38.212;

Modulation and coding scheme—five (5) bits as defined in Subclause 5.1.3 of 3GPP TS 38.214;

New data indicator—one (1) bit;

Redundancy version—two (2) bits as defined in Table 7.3.1.1.1-2 of 3GPP TS 38.212;

HARQ process number—four (4) bits;

Downlink Assignment Index (DAI)—two (2) bits as defined in Subclause 9.1.3 of 3GPP TS 38.213, as counter DAI;

Transmit Power Control (TPC) command for scheduled PUCCH—two (2) bits as defined in Subclause 7.2.1 of 3GPP TS 38.213;

PUCCH resource indicator—three (3) bits as defined in Subclause 9.2.3 of 3GPP TS 38.213; and PDSCH-to-HARQ_feedback timing indicator—three (3) bits as defined in Subclause 9.2.3 of 3GPP TS 38.213.

DRX, as shown in simplified DRX operation in FIG. 2, enables a UE to transition to a lower power state when the UE is not required to receive any transmission from the base station. There is an "onDuration" where the UE is awake and monitors for PDCCHs. If there is no PDCCH detected by the UE, an Inactivity timer begins. The UE continues to monitor for a PDCCH until a valid PDCCH addressed to the UE is received or the Inactivity timer expires. If the UE receives a valid PDCCH, the UE extends the Inactivity timer and continues to monitor for PDCCHs. If the inactivity timer expires, then the UE can stop receiving transmissions from the base station (e.g., no control monitoring) until end of the DRX cycle. Typically, the DRX parameters are configured by Radio Resource Control (RRC). In addition to those discussed above, some other parameters are configured by RRC such as, e.g., Round Trip Time (RTT) related parameters, HARQ related parameters, etc. The onDuration and the time duration when the Inactivity timer is running are also generally referred to as "active time".

In summary, the following terms are typically associated with DRX operation:

Active Time: Active time refers to time related to DRX operation, during which the Medium Access Control (MAC) entity monitors for PDCCHs.

DRX Cycle: DRX cycle refers to the periodic repetition of the onDuration followed by a possible period of inactivity (see FIG. 2).

Inactivity Timer: Inactivity timer generally refers to the number of consecutive PDCCH-subframe(s)/slots after the subframe/slot in which a PDCCH indicates an initial UL, DL, or sidelink user data transmission for a MAC entity that the UE waits before transitioning to sleep state.

MAC Entity: MAC entity is the medium access control entity, and there is one MAC entity per configured cell group (e.g., the master cell group and secondary cell group).

DRX functionality is configured by RRC, which is typically operating on a slower scale than MAC or Physical (PHY) layer. Thus, the DRX parameter settings, etc. cannot be changed quite adaptively through RRC configuration, especially if the UE has a mixture of traffic types.

SUMMARY

Systems and methods are disclosed herein for transitioning between two modes of operation at a wireless device in which the wireless device uses different scheduling delay assumptions. Embodiments of a method performed by a wireless device and corresponding embodiments of a wireless device are disclosed. In some embodiments, a method performed by a wireless device comprises monitoring, during a first slot, for a downlink control channel comprising downlink control information that schedules a transmission for the wireless device with an assumption of a first scheduling delay. The first scheduling delay is equal to or exceeds a first value. The method further comprises determining that the wireless device is to switch from the assumption of the first scheduling delay to an assumption of a second scheduling delay. The second scheduling delay is equal to or exceeds a second value, where the second value is less than the first value. The method further comprises monitoring, during one or more later slots that occur after the first slot, for a downlink control channel comprising downlink control information that schedules a transmission for the wireless device with the assumption of the second scheduling delay. In this manner, the wireless device can save power by, e.g., monitoring for a downlink control channel using the assumption of the first scheduling delay (e.g., assuming only cross-slot scheduling) until a time at which it determines that it should transition to the assumption of the second scheduling delay (e.g., assuming possible same-slot scheduling).

In some embodiments, monitoring for a downlink control channel comprising downlink control information that schedules a transmission for the wireless device with the assumption of the first scheduling delay comprises monitoring for a downlink control channel comprising downlink control information that schedules a transmission for the wireless device with the assumption of the first scheduling delay in a particular search space. In some embodiments, monitoring for a downlink control channel comprising downlink control information that schedules a transmission for the wireless device with the assumption of the second scheduling delay comprises monitoring for a downlink control channel comprising downlink control information that schedules a transmission for the wireless device with the assumption of the second scheduling delay in the particular search space.

In some embodiments, monitoring for a downlink control channel comprising downlink control information that schedules a transmission for the wireless device with the assumption of the first scheduling delay comprises monitoring for a downlink control channel comprising downlink control information that schedules a transmission for the wireless device with the assumption of the first scheduling delay in a first search space. Further, monitoring for a downlink control channel comprising downlink control information that schedules a transmission for the wireless device with the assumption of the second scheduling delay comprises monitoring for a downlink control channel comprising downlink control information that schedules a transmission for the wireless device with the assumption of the second scheduling delay in a second search space that is different than the first search space. In some embodiments, the first search space is associated with a first bandwidth and the second search space is associated with a second bandwidth, wherein the first bandwidth is smaller than the second bandwidth.

In some embodiments, determining that the wireless device is to switch from the assumption of the first scheduling delay to the assumption of the second scheduling delay comprises determining that the wireless device is to switch from the assumption of the first scheduling delay to the assumption of the second scheduling delay in response to an explicit or implicit indication from a network node. In some embodiments, the explicit or implicit indication is an explicit indication comprised in downlink control information from the network node.

In some embodiments, monitoring, during the first slot, for a downlink control channel comprising downlink control information that schedules a transmission for the wireless device with the assumption of the first scheduling delay comprises monitoring, during the first slot, for a downlink control channel comprising downlink control information that schedules a transmission for the wireless device with the assumption of the first scheduling delay while the wireless device operates in a first power mode that is associated with the first scheduling delay. Determining that the wireless device is to switch from the assumption of the first scheduling delay to the assumption of the second scheduling delay comprises transitioning from the first power mode to a second power mode associated with the second scheduling delay. In some embodiments, transitioning from the first power mode to a second power mode associated with the second scheduling delay comprises transitioning from the first power mode to a second power mode associated with the second scheduling delay in response to an indication comprised in downlink control information from a network node. In some embodiments, transitioning from the first power mode to a second power mode associated with the second scheduling delay comprises transitioning from the first power mode to a second power mode associated with the second scheduling delay upon sending a Hybrid Automatic Repeat Request (HARQ) Acknowledgement (ACK) for a transmission scheduled by downlink control information comprised in a downlink control channel detected in the first slot. In some embodiments, transitioning from the first power mode to a second power mode associated with the second scheduling delay comprises transitioning from the first power mode to a second power mode associated with the second scheduling delay upon expiration of a timer. In some embodiments, expiration of the timer is dependent on lack of receiving a downlink control channel in a configured number of monitoring occasions.

In some embodiments, determining that the wireless device is to switch from the assumption of the first scheduling delay to the assumption of the second scheduling delay comprises determining that the wireless device is to switch from the assumption of the first scheduling delay to the assumption with the second scheduling delay upon sending a HARQ ACK for a transmission scheduled by downlink control information comprised in a downlink control channel detected in the first slot.

In some embodiments, determining that the wireless device is to switch from the assumption of the first scheduling delay to the assumption of the second scheduling delay comprises determining that the wireless device is to switch from the assumption of the first scheduling delay to the assumption of the second scheduling delay upon expiration of a timer. In some embodiments, expiration of the timer is dependent on lack of receiving a downlink control channel in a configured number of monitoring occasions.

In some embodiments, the first power mode is a Power Savings Mode (PSM) and the second power mode is a non-PSM, or the first power mode is a non-PSM and the second power mode is a PSM.

In some embodiments, the first value is a value that corresponds to a value that is greater than or equal to one slot. In some embodiments, the second value is a value that corresponds to a value of zero slots. In some embodiments, the first value is a value determined based on a wireless device indication dependent on only physical downlink shared channel numerology, or physical downlink control channel and physical downlink shared channel numerologies. In some embodiments, the method further comprises, based on an assumption that downlink scheduling detected on the downlink control channel in the first slot schedules a downlink transmission to the wireless device with the first scheduling delay that exceeds the first value, operating in a low power mode during the first slot when not monitoring the downlink control channel. In some embodiments, monitoring the downlink control channel during the first slot comprises monitoring the downlink control channel at a beginning portion of the first slot, and the method further comprises, based on the assumption of the first scheduling delay, operating in a low power mode during the first slot starting at an end of the beginning portion of the first slot during which the downlink control channel is monitored.

In some embodiments, determining that the wireless device is to switch from the assumption of the first scheduling delay to the assumption of the second scheduling delay comprises determining that a downlink control channel comprising downlink control information that schedules a transmission for the wireless device is detected during the first slot. In some embodiments, the one or more later slots comprise a second slot that immediately follows the first slot. In some embodiments, the one or more later slots occur after a slot in which the wireless device sends a HARQ response for the transmission scheduled by the downlink control information comprised in the downlink control channel detected in the first slot. In some other embodiments, the one or more later slots occur after a slot in which the wireless device sends a HARQ ACK for the transmission scheduled by the downlink control information comprised in the downlink control channel detected in the first slot. In some other embodiments, the one or more later slots occur after a slot in which the wireless device detects another downlink control channel that comprises downlink control information that schedules a transmission for the wireless device in accordance with the second scheduling delay. In some embodiments, the method further comprises, in one or more subsequent slots that follow the first slot and precede the one or more later slots, monitoring for a downlink control channel comprising downlink control information that schedules a transmission for the wireless device with the assumption of the first scheduling delay. In some other embodiments, the first slot is during a Discontinuous Reception (DRX) On Duration, and the one or more later slots are all slots that occur later than the first slot in the DRX On Duration. In some other embodiments, the first slot is during a DRX On Duration, and the one or more later slots are a predefined number of slots that occur later than the first slot in the DRX On Duration. In some embodiments, the method further comprises switching to monitoring for a downlink control channel comprising downlink control information that schedules a transmission for the wireless device with the assumption of the first scheduling delay or with both the assumption of the first scheduling delay and the assumption of the second scheduling delay.

In some embodiments, a wireless device comprises radio front end circuitry and processing circuitry associated with the radio front end circuitry. The processing circuitry is configured to cause the wireless device to monitor, during a first slot, for a downlink control channel comprising downlink control information that schedules a transmission for the wireless device with an assumption of a first scheduling delay, where the first scheduling delay is equal to or exceeds a first value. The processing circuitry is further configured to cause the wireless device to determine that the wireless device is to switch from the assumption of the first scheduling delay to an assumption of a second scheduling delay, where the second scheduling delay is equal to or exceeds a second value and the second value is less than the first value. The processing circuitry is further configured to cause the wireless device to monitor, during one or more later slots that occur after the first slot, for a downlink control channel comprising downlink control information that schedules a transmission for the wireless device with the assumption of the second scheduling delay.

In some embodiments, in order to cause the wireless device to determine that the wireless device is to switch from the assumption of the first scheduling delay to the assumption of the second scheduling delay, the processing circuitry is further configured to cause the wireless device to determine that the wireless device is to switch from the assumption of the first scheduling delay to the assumption of the second scheduling delay in response to an explicit or implicit indication from a network node. In some embodiments, the explicit or implicit indication is an explicit indication comprised in downlink control information from the network node.

In some embodiments, the processing circuitry is further configured to cause the wireless device to monitor, during the first slot, for a downlink control channel comprising downlink control information that schedules a transmission for the wireless device with the assumption of the first scheduling delay while the wireless device operates in a first power mode that is associated with the first scheduling delay. Further, in order to cause the wireless device to determine that the wireless device is to switch from the assumption of the first scheduling delay to the assumption of the second scheduling delay, the processing circuitry is further configured to cause the wireless device to transition from the first power mode to a second power mode associated with the second scheduling delay. In some embodiments, the processing circuitry is further configured to cause the wireless device to transition from the first power mode to the second power mode in response to an indication comprised in downlink control information from a network node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 20, 21, 22, and 23 are flow charts illustrating methods implemented in a communication system in accordance with some embodiments of the present disclosure.

DETAILED DESCRIPTION

Figure 1:
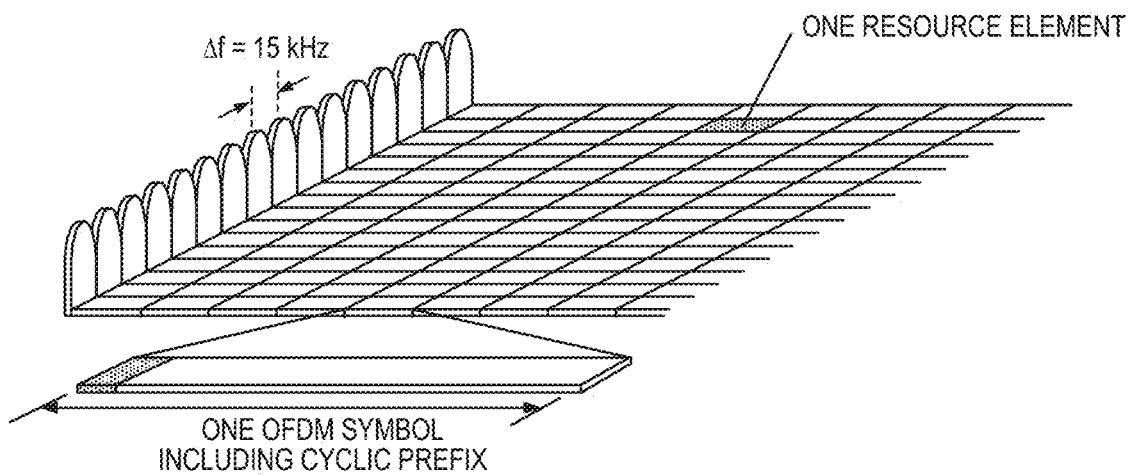
FIG. 1 illustrates an exemplary radio resource in New Radio (NR)
Figure 2:
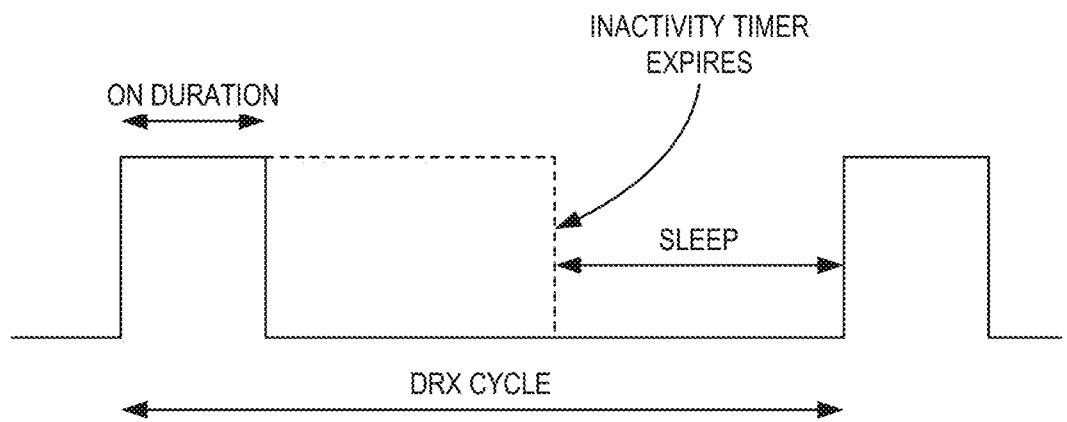
FIG. 2 illustrates an example of Discontinuous Reception (DRX) operation.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

There currently exist certain challenge(s), e.g., with respect to achieve low power operation of the User Equipment (UE) in a cellular communications network such as, e.g., New Radio (NR). For example, currently in NR, the UE is configured through a single higher layer configuration by which the UE can either be scheduled with same-slot scheduling (e.g., minimum K0=0) or cross-slot scheduling (e.g., minimum K0>0) for receiving unicast Physical Downlink Shared Channel (PDSCH). Note that "K0" is a parameter that defines a scheduling delay between the Downlink Control Information (DCI) scheduling a PDSCH transmission to the UE and the PDSCH transmission. In this case, either:

a) The UE has to support same-slot scheduling, which means the UE has to decode Physical Downlink Control Channel (PDCCH) and determine whether there is associated PDSCH for the UE in the same slot. This reduces the opportunity for power consumption reduction because the UE needs to collect potential PDSCH samples and/or operate in a bandwidth mode suitable for potential PDSCH reception; or b) The UE has to always receive data in cross-slot scheduling, which means increased latency because of the delay in scheduling.

Adaptation between same-slot and cross-slot scheduling is currently achieved via higher layers such as Radio Resource Control (RRC), which can require large overhead and is quite slow. Hence, such adaptation is not desirable, leading to reduced throughput and increased latency.

Certain aspects of the present disclosure and the embodiments described herein may provide solutions to these or other challenges.

In some embodiments, a method performed by a wireless device comprises monitoring a downlink control channel for downlink scheduling information, wherein any received downlink scheduling can schedule a downlink transmission to occur after a first scheduling delay. The method further comprises receiving first downlink scheduling information for a first data transmission according to the first scheduling delay, receiving the first data transmission at the scheduled time, and monitoring the downlink control channel for downlink scheduling information, wherein any received downlink scheduling can schedule a downlink transmission to occur after a second scheduling delay and the second scheduling delay is less than the first scheduling delay.

Particular embodiments include systems and methods to support a first set of K0 values for receiving DCI associated with a PDSCH in a first search space and a second set of K0 values for receiving DCI associated with a PDSCH in the first search space or a second search space. A base station sends DCI including scheduling data to the UE using the first search space, in accordance with the first set of K0 values. The scheduling data schedules a PDSCH to the UE, where the scheduling delay for the scheduled PDSCH is in accordance with the first set of K0 values. The UE monitors the first search space and thereby receives the DCI. The UE receives the scheduled PDSCH from the base station in accordance with the scheduling data, and sends a feedback (e.g., a Hybrid Automatic Repeat Request (HARQ) feedback) to the base station for the scheduled PDSCH. The UE also monitors for DCI in the first or in a second search space supporting a second set of K0 values for data reception through the DCI. The first set of K0 values may enable the UE to receive data with reduced power consumption relative the case of receiving data with the second set of K0 values. The UE monitors for DCI with the second set of K0 values in the first or in a second search space only when the feedback for the scheduled data is a HARQ-Acknowledgement (ACK). The first set of K0 value(s) may mean cross-slot scheduling, and a second set of K0 values may mean same-slot scheduling.

In general, particular embodiments include: turning on/off delayed PDCCH to PDSCH scheduling based on data arrival for the UE; configuring the UE with at least two search spaces, and the two search spaces having different minimum K0 values (where K0 is the PDCCH to PDSCH scheduling delay) and switching the PDCCH monitoring dynamically between these search spaces; and configuring different sets of K0 values for same search space and switching between the different sets of K0 values based on an implicit or an explicit dynamic indication.

There are, proposed herein, various embodiments which address one or more of the issues disclosed herein. Certain embodiments may provide one or more of the following technical advantage(s). For example, particular embodiments reduce UE power consumption by fast, robust, and physical-layer based transition between a) cross-slot scheduling and b) same-slot scheduling for downlink data scheduling. The power consumption reduction may be in the form of reduced Radio Frequency (RF)—on time for sample collection, or in the form of lower-Bandwidth (BW) operation for PDCCH monitoring if the PDSCH may be a wider-BW than PDCCH. Details of these embodiments are provided below.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 3:
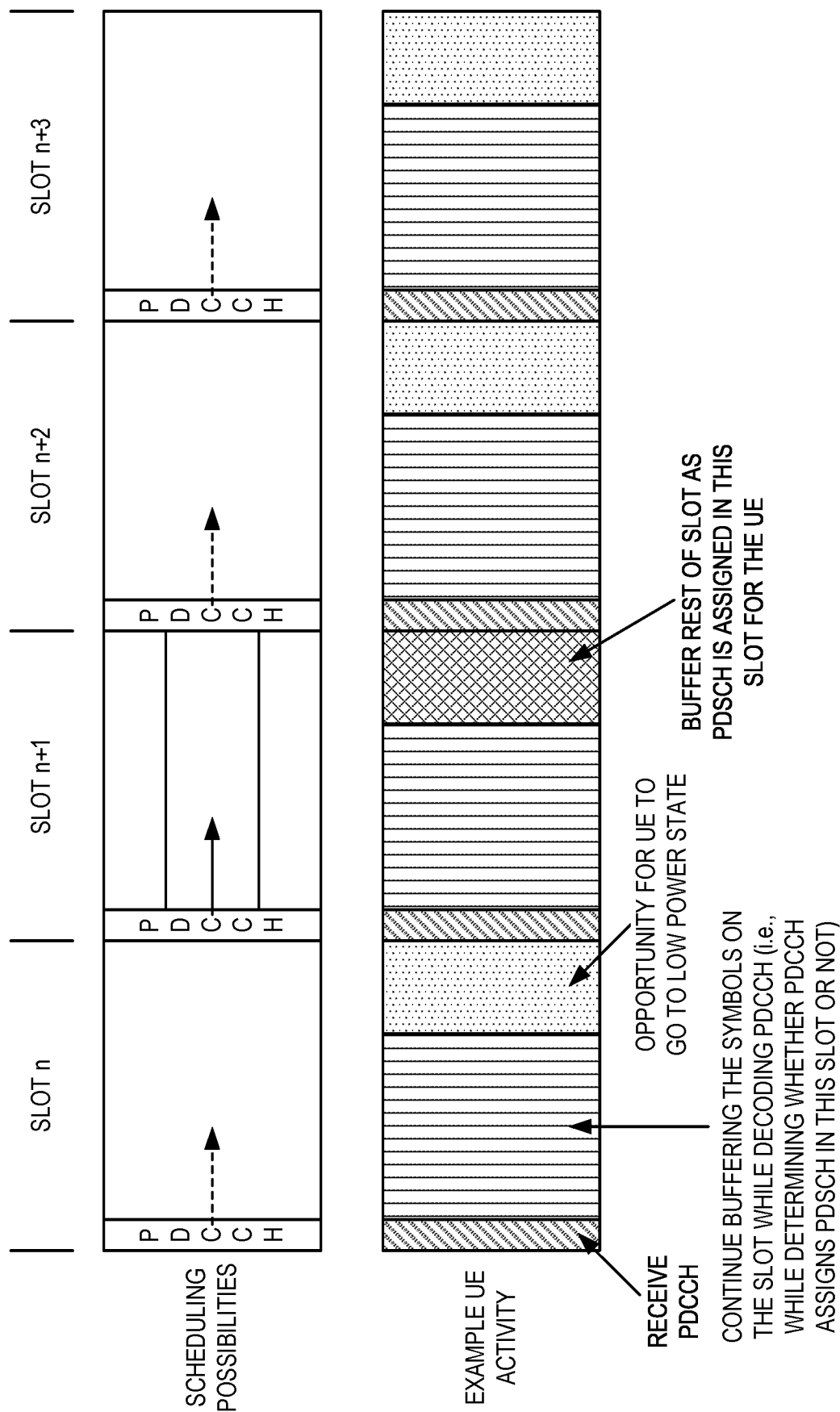
FIG. 3 is a block diagram illustrating scheduling possibilities with same-slot scheduling and example User Equipment (UE) activity.

FIG. 3 is a block diagram illustrating scheduling possibilities with same-slot scheduling and example UE activity. A UE is configured to monitor for PDCCH in multiple slots n, n+1, n+2, . . . . The PDCCH can assign data using PDSCH in the same slot, i.e., K0 can be 0. K0 is generally considered as the delay between a PDCCH and the beginning of a PDSCH assigned by that PDCCH. In this example, PDSCH is scheduled for the UE in slot n+1, but there is no PDSCH scheduled for the UE in slots n, n+2, and n+3.

Now considering example UE activity, the UE receiver has to be 'ON' (or in a high power consuming state) to receive the PDCCH symbols in slot n. Because the UE receiver does not know in advance whether there will be PDSCH assigned by the PDCCH in slot n or not, the UE receiver needs to continue buffering symbols (or continue in ON state) until the UE finishes PDCCH monitoring (i.e., decoding all possible PDCCH candidates for slot n). If at the end of PDCCH monitoring the UE determines that there is no PDSCH assigned in that slot (e.g., as shown for slots n, n+2, and n+3), the UE can transition to OFF state (or a low power consuming state, or a Power Savings Mode (PSM)) for the reminder of the slot. If the UE determines that there is PDSCH assigned in that slot (e.g., as shown for slot n+1), the UE stays ON for rest of the slot to buffer all the symbols where PDSCH is expected.

Figure 4:
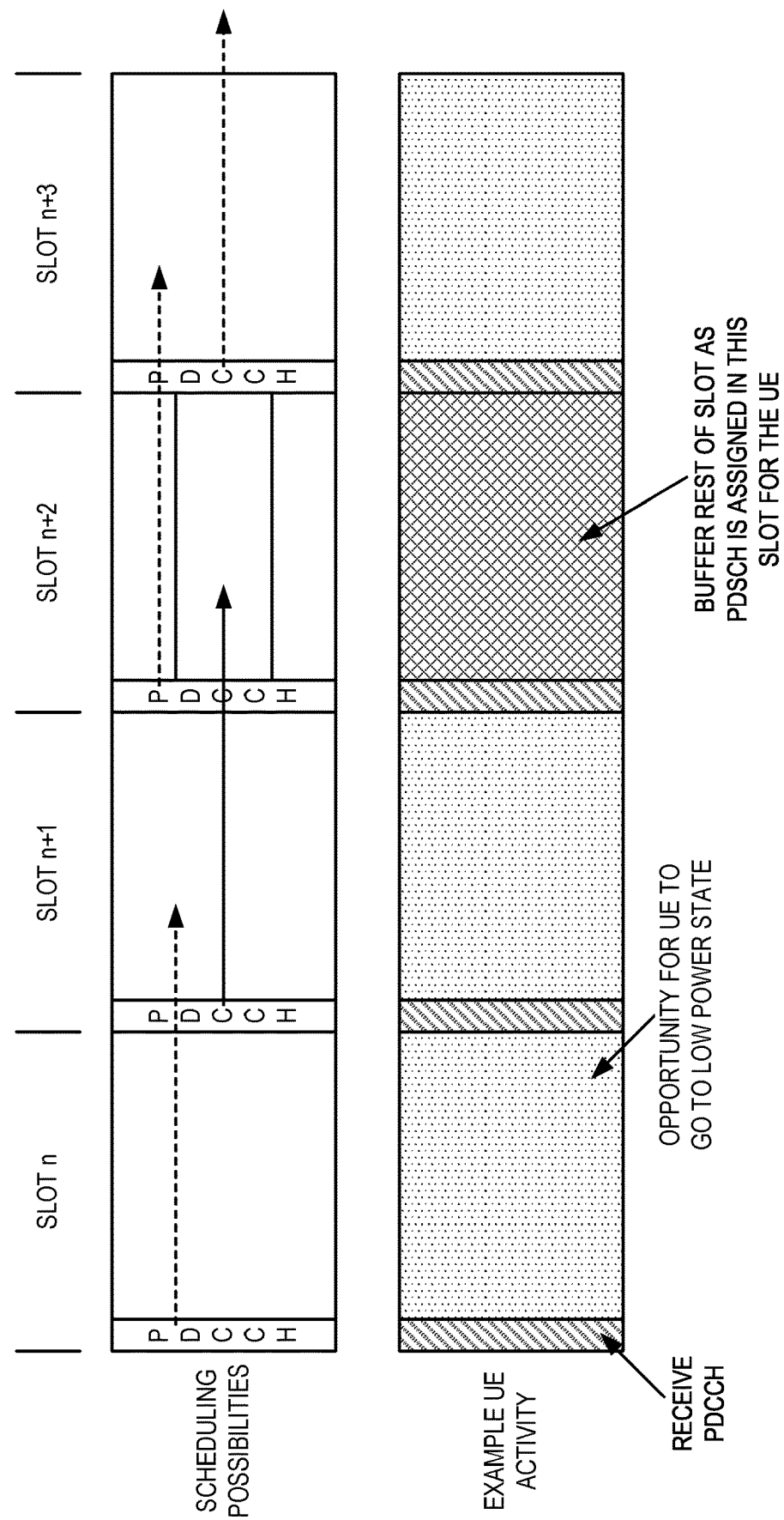
FIG. 4 is block diagram illustrating scheduling possibilities with cross-slot scheduling and example UE activity.

FIG. 4 is block diagram illustrating scheduling possibilities with cross-slot scheduling and example UE activity. Compared to FIG. 3, the scheduling pattern is restricted such that PDCCH can only assign PDSCH with a delay of one slot or even more (i.e., K0>1). Note that K0 is rounded to a slot level value in these examples, but more generally the scheduling delay can be expressed in terms of symbols that comprise a slot or some other time unit such as ms or microseconds. Similar to FIG. 3, there is data for the UE scheduled via PDCCH in slot n+1. The data itself is scheduled in slot n+2 due to the K0 delay. There is no PDSCH assigned by PDCCH in other slots. Now considering example UE activity for this setup, considering slot n+1, the UE needs to be in ON state to receive PDCCH in the beginning of the slot. For the remainder of the slot, the UE can be in OFF state because whether PDSCH is assigned or not for slot n+1 is signaled via PDCCH in slot n, which the UE has already decoded in slot n. The UE, however, needs to be in ON state for all symbols in slots where PDSCH is assigned, e.g., in slot n+2 as there is data assigned to it, assuming in this example that the PDSCH spans the entire slot.

A comparison of the UE activity in FIGS. 3 and 4 illustrates that the UE can stay OFF longer when the scheduling is delayed (i.e., K0 is larger than the PDCCH decoding delay of the UE). This is beneficial for UE power consumption savings. However, delaying the scheduling increases latency (e.g., PDSCH needs to be delayed from slot n+1 to n+2 in the above examples). This needs to be avoided as much as possible.

Additionally, a related UE power savings opportunity for the UE is to receive PDCCH with a relatively narrower-BW receiver, where the BW may be based on the search space configuration. However, when the UE is configured for same-slot PDSCH reception, the lower-BW operation is not feasible because typical transition times into wider-BW operation may be on the order of 0.5-1 milliseconds (ms), i.e. on the slot duration level. Operating in the K0>0 mode, the UE can use a BW adaptation mechanism for additional power savings.

Particular embodiments of the present disclosure dynamically adapt the delayed scheduling described above to achieve UE power savings without an unnecessary increase in scheduling delay.

Figure 5:
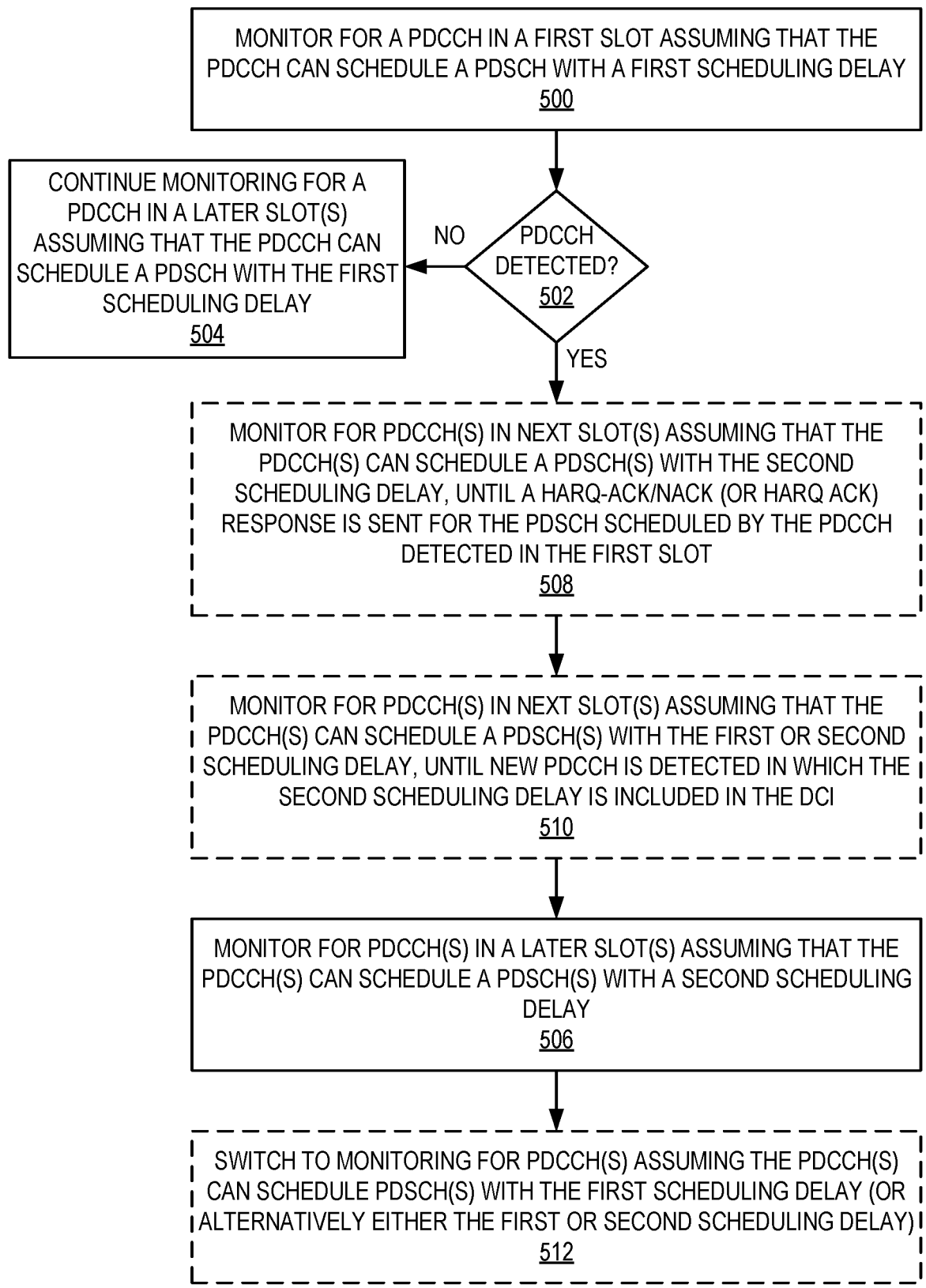
FIG. 5 is a flow chart that illustrates the operation of a UE in accordance with some embodiments of the present disclosure.

Particular embodiments of the present disclosure turn on/off delayed PDCCH to PDSCH scheduling based on data arrival for the UE. As illustrated in FIG. 5 (in which optional steps are represented by dashed boxes), in one example, the UE monitors for a PDCCH in a first slot assuming that the PDCCH can schedule PDSCH with a first scheduling delay that always exceeds a first value (e.g., minimum K0>1 slot) (step 500). In other words, during the first slot, the UE monitors for a PDCCH including DCI scheduling a PDSCH for the UE, where the UE makes an assumption that a PDDCH in the first slot can schedule a PDSCH with the first scheduling delay. This assumption enables the UE to take certain actions, e.g., to monitor in a specific search space assigned for the first scheduling delay and/or to enter a low power state to save power. For example, if the first scheduling delay is always greater than or equal to one (1) slot such that the UE can assume cross-slot scheduling, then the UE monitors for a PDCCH in a beginning portion (e.g., first one or few OFDM symbols) of the first slot and then, based on the assumption of cross-slot scheduling, may enter a low power state (OFF state) for the remaining portion of the first slot (see, e.g., slot n of FIG. 4). As discussed above, this is because the UE does not need to continue buffering PDSCH symbols when processing the PDCCH symbols because the UE can assume that the PDCCH received in the first slot, if any, uses cross-slot scheduling (i.e., schedules a PDSCH some future slot). If the UE does not detect a PDCCH in the first slot assigning PDSCH with data for the UE (e.g., using a DL-SCH) (step 502, NO), during later slots (i.e., slots later than the first slot), the UE continues monitoring for a PDCCH assuming that the PDCCH can schedule PDSCH with the first scheduling delay (step 504). If the UE detects a PDCCH in the first slot that assigns PDSCH with data for the UE (step 502, YES), the UE monitors for PDCCHs in later slots assuming that the PDDCHs in those later slots can schedule PDSCHs with a second scheduling delay that always exceeds a second value, where the second value is smaller than the first value (e.g., K0=0 slots) (step 506). In other words, during the later slot(s), the UE monitors for a PDCCH including DCI scheduling a PDSCH for the UE, where the UE makes an assumption that a PDDCH in the later slot(s) can schedule a PDSCH with the second scheduling delay. For example, if the second scheduling delay is always greater than or equal to 0 slots such that the UE cannot assume cross-slot scheduling (i.e., assumes that there may be same-slot scheduling), then the UE monitors for a PDCCH in a beginning portion (e.g., first one or few Orthogonal Frequency Division Multiplexing (OFDM) symbols) of the first slot and then, based on the assumption of possible same-slot scheduling, remains in the ON state to buffer PDSCH symbols while processing the PDCCH symbols (see, e.g., slot n of FIG. 3). Note that the decision in step 502 is also referred to herein as a way of determining whether the UE is to switch from the assumption of the first scheduling delay to the assumption of the second scheduling delay.

In step 506, the UE monitors for PDCCHs in later slots assuming that the PDDCHs in those later slots can schedule PDSCHs with the second scheduling delay. In the above example, these 'later slots' can be slots later than the first slot, and also later than a slot in which the UE sends a HARQ-ACK response to the PDSCH assigned by the PDCCH in the first slot. In this case, the UE continues to monitor PDDCH using first scheduling delay until it sends a HARQ-ACK/Negative Acknowledgement (NACK) for a PDSCH received by the UE (step 508) and only then it switches to monitoring PDCCH using the second scheduling delay (step 506). An advantage of this option is that the HARQ-ACK/NACK serves as a confirmation to the base station (e.g., NR base station (gNB)) that schedules the UE that the base station can now send PDCCHs with the second scheduling delay. The UE may alternatively continue monitoring PDCCH using the first scheduling delay until it sends ACK as the HARQ response (step 508), and switch to monitoring using the second scheduling delay only after ACK is sent (i.e., if NACK is sent as HARQ response, the UE does not switch) (step 506).

In some cases, for example where there are chances that the ACK sent by the UE can be missed or misdetected at the base station, the UE may alternatively continue monitoring PDCCH assuming both first and second scheduling delay, even after sending ACK and until it detects one more PDCCH from the base station (step 510). In the new PDCCH DCI, if the base station schedules the UE using use the second scheduling delay, then in the later occasions, the UE can monitor PDCCH assuming the second scheduling delay (step 506). In the new PDCCH DCI, if the enhanced or evolved Node B (eNB) still schedules the UE with a delay corresponding to first scheduling delay, then most likely the confirmation ACK sent by the UE was missed or misdetected, i.e., a retransmission needs to be done accordingly.

If the UE is configured with DRX, the UE can continue monitoring PDCCH assuming the second scheduling delay as long as it is in active time, or until it goes back into DRX. In subsequent 'on durations', the UE falls back to monitoring PDCCH assuming the first scheduling delay (step 512).

If the UE is configured with DRX, after the first detection of a PDSCH and the transmission of a HARQ-ACK, the UE can switch to the second scheduling delay and continue monitoring with the second scheduling delay until no PDSCH is received in P consecutive slots (step 506) after which it switches back to monitoring with the first scheduling delay (step 512). The value P can be lower than a parameter Q which represents the number of slots without receiving PDSCH after which the UE goes back into DRX.

Alternatively, after switching to the second scheduling delay in step 506, in some later slots, the UE can be configured to monitor both sets of delay values (step 512). If the UE detects that the first scheduling delay set is used again, it switches back to monitoring with the first scheduling delay.

If the UE is configured to receive an explicit go-to-sleep indication from the network, the UE can continue monitoring PDCCH assuming the second scheduling delay until a go-to-sleep indication is received from the network, and whenever the UE monitors PDCCH after receiving the go-to-sleep indication, it can fall back to monitoring PDCCH assuming the first scheduling delay (step 512).

In one approach related to the above example, monitoring PDCCH assuming the first scheduling delay can correspond to monitoring PDCCH associated with a first search space, and monitoring PDCCH assuming the second scheduling delay can correspond to monitoring PDCCH associated with a second search space. In another approach related to the above example, monitoring PDCCH assuming the first scheduling delay or the second scheduling delay can correspond to monitoring PDCCH associated with the same search space.

While the UE is monitoring PDCCH that can assign (or schedule) PDSCH with data for the UE (e.g., using a Downlink Shared Channel (DL-SCH)), along with this, the UE can also monitor PDCCH that can assign PDSCH with broadcast data (e.g., using a Broadcast Channel (BCH), Paging Channel (PCH)). To monitor PDCCH that can assign PDSCH with data for the UE, the UE can use a specific Radio Network Temporary Identifier (RNTI) such as Cell RNTI (C-RNTI). To monitor PDCCH that can assign broadcast data, the UE can use Paging RNTI (P-RNTI)/Random Access RNTI (RA-RNTI)/System Information RNTI (SI-RNTI) for receiving paging, Random Access Channel (RACH) and system information related data, respectively. The UE may monitor PDCCH that can assign PDSCH with broadcast data assuming a fixed or preconfigured scheduling delay (i.e., PDCCH monitoring related to broadcast data need not be affected by the switch in PDCCH monitoring related to receiving UE-specific data).

Particular embodiments include different sets of K0 values for different search spaces. For example, a UE can be configured with different set of K0 values for different search spaces. The search spaces can be UE-specific search spaces only. Then, if the UE is looking for a first search space only, the UE can save power if a first set of configured K0 values is allowed for downlink data scheduled from the first search space. If the UE is looking for a second search space only, the UE can save a different amount of power if a different set of K0 values is allowed for downlink data scheduled from the second search space.

Figure 6:
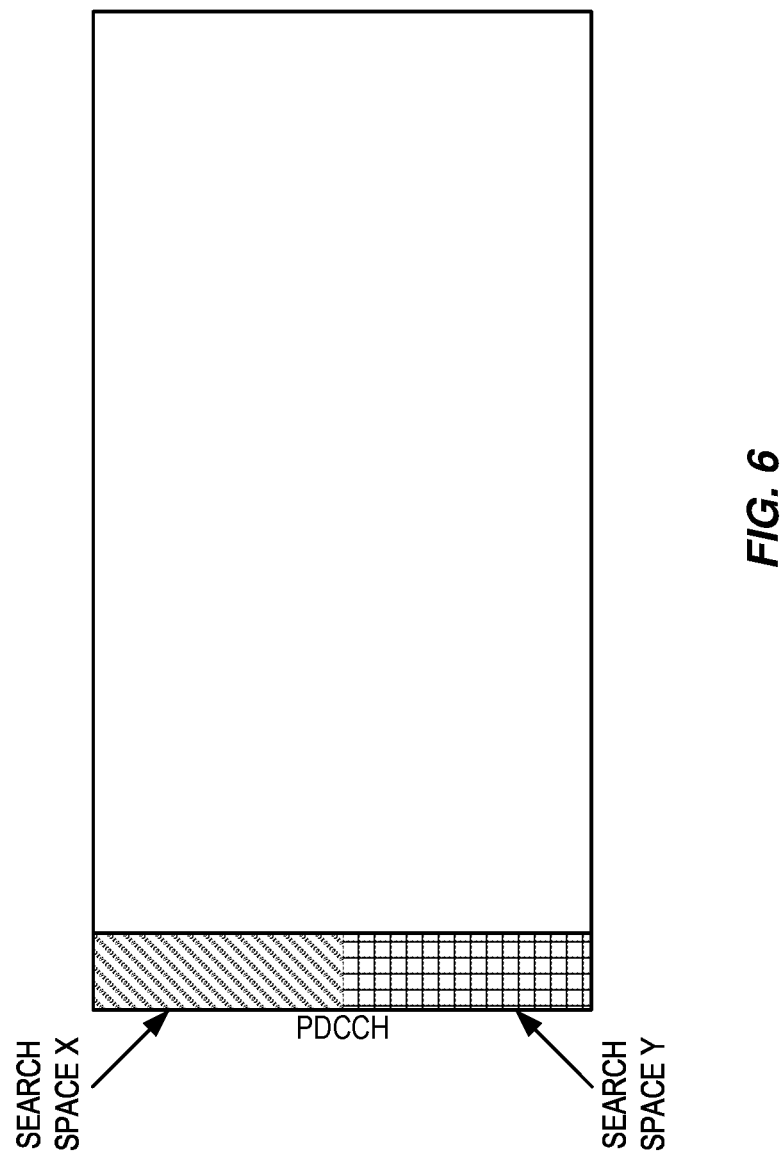
FIG. 6 shows an example of different search spaces (denoted as search spaces X and Y) in which a Physical Downlink Control Channel (PDCCH) can be transmitted.
Figure 7:
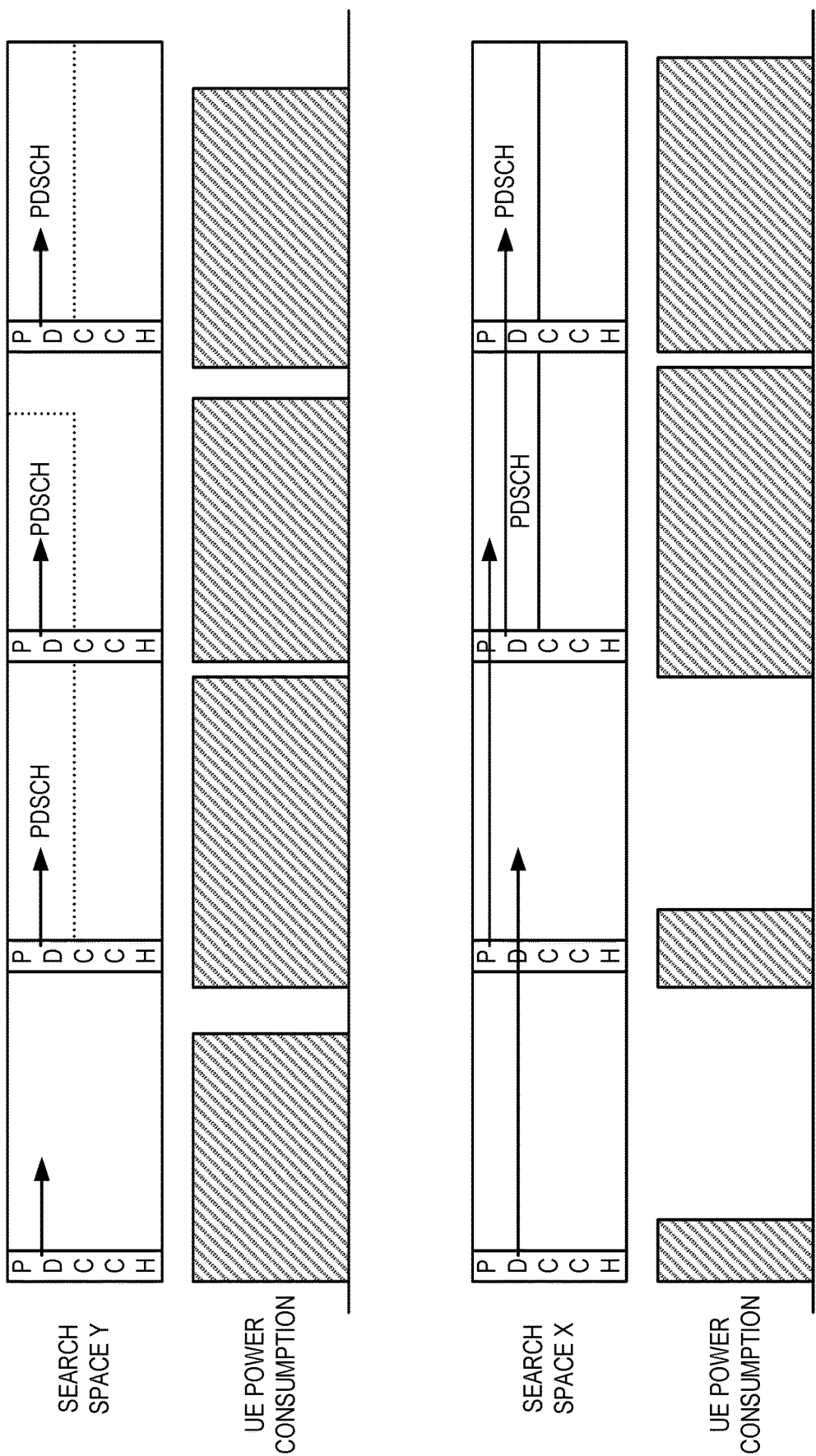
FIG. 7 shows an example where search space X allows cross-slot scheduling only and search space Y allows same-slot scheduling only, in accordance with some embodiments of the present disclosure.

FIG. 6 shows an example of search spaces X and Y and PDCCH. FIG. 7 shows an example where search space X allows cross-slot scheduling only, and search space Y allows same-slot scheduling only. In FIG. 6, the UE power consumption is shown to be similar between PDCCH-only monitoring duration (or slot) and the duration (or slot) with PDCCH monitoring and PDSCH reception, but in practice the power levels can be different for the two cases.

In the above case, if the UE is looking for DCI in only search space X (i.e., monitoring for a PDCCH containing DCI in only search space X), the UE can go to sleep right after buffering the PDCCH in a given slot because it knows that the PDSCH is expected to be scheduled only in the next slot. Because the UE can determine this well in advance (e.g., without having to decode the PDCCH and deciding to shut-off or stay on), the opportunity for saving power can be relatively higher.

In the above case, if the UE is looking for DCI in only search space Y (i.e., monitoring for a PDCCH containing DCI in only search space Y), the UE may not be able to go to sleep right after buffering the PDCCH in a given slot because it has to decode the PDCCH and then determine whether to shut-off or stay on, and hence the opportunity for saving power can be relatively lower.

Figure 8:
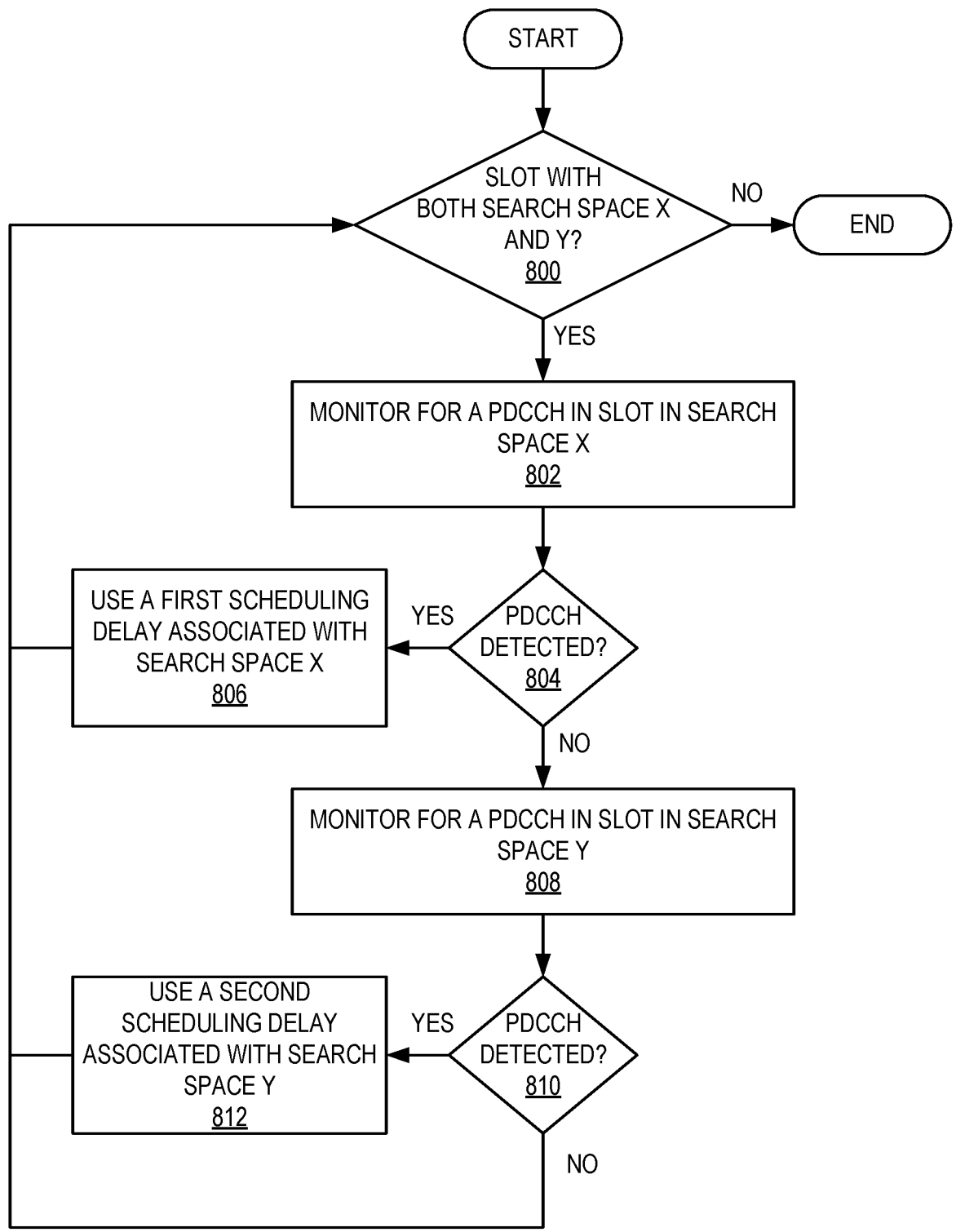
FIG. 8 is a flow chart that illustrates the operation of a UE to switch between different modes of operation using different assumed scheduling delays (i.e., using cross-slot scheduling only or using same-slot scheduling) in accordance with some embodiments of the present disclosure.

Alternatively, in some slots, both search space X and Y can be present. The UE checks search space X first. If a DCI is found (or all DCIs have been found), it stops and does not check search space Y. The UE then switches back to using the delay values associated with search space X. In later slots, where both search space X and Y can be present, if the UE finds a DCI in search space Y, then the UE switches back to use the delay values associate with search space Y. FIG. 8 illustrates one example of this process. As illustrated, if a particular slot has both search space X and search space Y (step 800, YES), the UE monitors search space X for a PDCCH including DCI that schedules a PDSCH for the UE (step 802). If such a PDCCH is detected (step 804, YES), the UE uses a first scheduling delay associated with search space X (step 806). In other words, the UE operates in accordance with an assumption that PDCCH(s) in a later slot(s) includes DCI with the first scheduling delay. If a PDCCH is not detected in search space X (step 804, NO), the UE monitors search space Y for a PDCCH including DCI that schedules a PDSCH for the UE (step 808). If such a PDCCH is detected in search space Y (step 810, YES), the UE uses a second scheduling delay associated with search space X (step 812). In other words, the UE operates in accordance with an assumption that PDCCH(s) in a later slot(s) includes DCI with the second scheduling delay. In this manner, the UE is able to switch between cross-slot scheduling and same-slot scheduling operation (e.g., switch between a PSM in which cross-slot scheduling only is used and a non-PSM in which same-slot scheduling can be used).

In particular embodiments, the UE can start to look for DCI in only search space X. If the UE gets scheduled with a PDSCH in search space X, the UE can report a particular feedback (e.g., HARQ-ACK), and the UE can start looking for DCI in search space X (and Y) or search space Y only.

Figure 9:
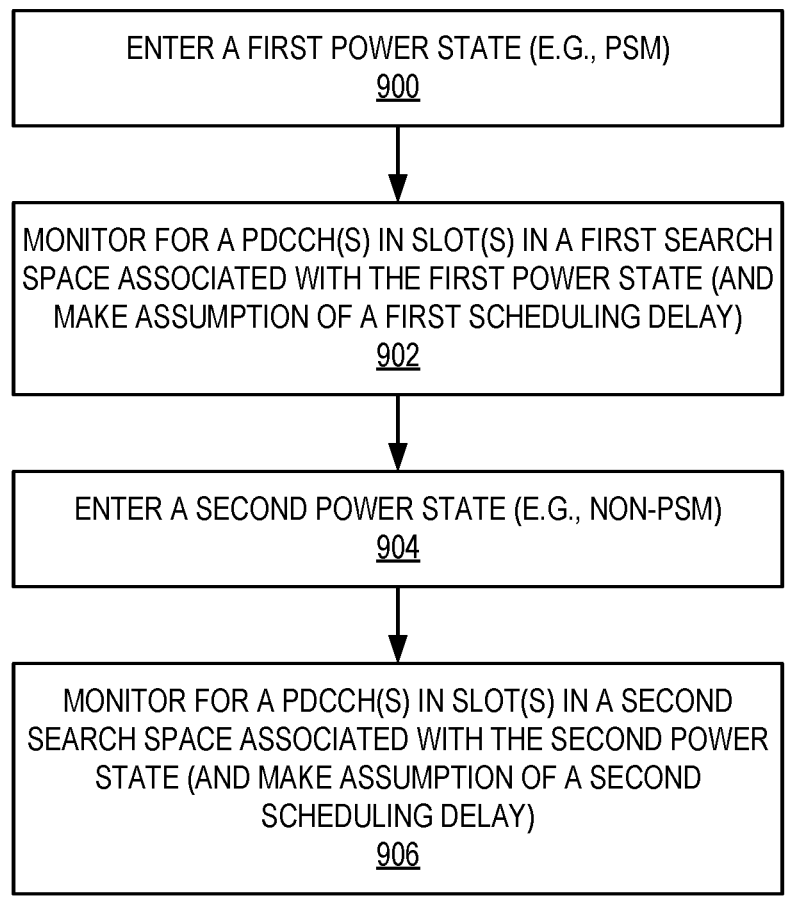
FIG. 9 is a flow chart that illustrates the operation of a UE in which the UE transitions between different power modes in which different scheduling delays are used in accordance with some embodiments of the present disclosure.

In some embodiments a UE is configured with at least two search spaces, and the two search spaces have different minimum K0 values (for PDCCH-to-PDSCH scheduling), search space X and search space Y. The UE looks for DCI in search space X when in PSM. In one alternative, the UE looks for DCI in search space X and search space Y when not in PSM. In another alternative, the UE looks for DCI in search space Y when not in PSM. FIG. 9 is a flow chart that illustrates the operation of the UE in this regard. As illustrated, the UE enters a first power mode (e.g., a PSM) (step 900). While in the first power mode, the UE monitors for PDCCH(s) in a slot(s) in a first search space associated with the first power mode (e.g., search space X for PSM) (step 902). The first search space is associated with a first minimum K0 value. As discussed above, the UE assumes that PDSCH(s) scheduled by the DCI in the PDCCH(s) detected in the first search space have a scheduling delay that is equal to or greater than the first minimum K0 value and, as discussed above, can take certain actions based on that assumption that impact power consumption. Sometime thereafter, the UE enters (e.g., switches to) a second power mode (e.g., a non-PSM) (step 904). The second search space is associated with a second minimum K0 value that is different than the first minimum K0 value. As discussed below, the UE enters the second power mode upon determining that it should transition from the first power mode to the second power mode (e.g., based on any one or any combination of various criteria, as described below). In this manner, the UE determines that it is to switch from the assumption of the first scheduling delay associated with the first power mode and the second scheduling delay associated with the second power mode. While in the second power mode, the UE monitors for PDCCH(s) in a slot(s) in a second search space associated with the second power mode (e.g., search space Y for non-PSM) (step 906). As discussed above, the UE assumes that PDSCH(s) scheduled by the DCI in the PDCCH(s) detected in the second search space have a scheduling delay that is equal to or greater than the second minimum K0 value and, as discussed above, can take certain actions based on that assumption that impact power consumption.

A UE can be expected to transition from PSM to non-PSM mode (e.g., in step 900 or 904) based on one or more following criteria:
- UE detects a scheduling PDCCH in search space X,
    - The scheduling PDCCH can be for a first transmission of a transport block and/or could even apply to a HARQ retransmission of a transport block;
- UE transmits ACK for a PDSCH scheduled by PDCCH in search space X;
- UE receives a message scheduled via search space X to transition from PSM to regular mode, e.g. a DCI order;
- After the end of the current DRX cycle;
- At the beginning of Onduration.

Transition from non-PSM to PSM (e.g., in step 900 or 904) can be based on:
- A timer, where expiration of the timer can be dependent on lack of receiving PDCCH in a configured number of monitoring occasions. The number of monitoring occasions after which the transition from non-PSM to PSM is made can be lower than the number of monitoring slots without PDSCH after which the UE falls back into DRX.
- UE receiving a message scheduled via search space Y to transition from non-PSM to PSM mode, e.g. a DCI order.
- After the end of the current DRX cycle or at the beginning of Onduration.
- Starting in Connected mode DRX (CDRX) ON in PSM mode is also an option.

Search space X can be configured to facilitate one or more of the following:
- Lower BW than search space Y
- Fewer blind decodes than search space Y
- Fewer symbols than search space Y However, search space X and search space Y may also have the same BW, BD, or number of symbol parameters.

Search space X and search space Y can map to the same Core Resource Set (CORESET). Search space X and Y can map to different CORESETs. Search space X and search space Y can be both UE-specific search spaces. Search space X is associated with a first set of K0 values, in one embodiment including values K0>0. Search space Y is associated with second set of K0 values, in one embodiment limited to the value K0=0.

Particular embodiments configure different sets of K0 values for same search space and transitioning based on a dynamic indication. For example, a UE can be configured with different set of K0 values for a same search space. The search space can be UE-specific search space only. When the UE first begins to look for DCI in the search space only, the UE is allowed be scheduled with a first set of configured K0 values only for downlink data scheduled from the search space. If the UE receives downlink data and sends a HARQ feedback (such as ACK), then the UE is allowed to be scheduled with a second set of configured K0 values only for downlink data scheduled from the search space.

Figure 10:
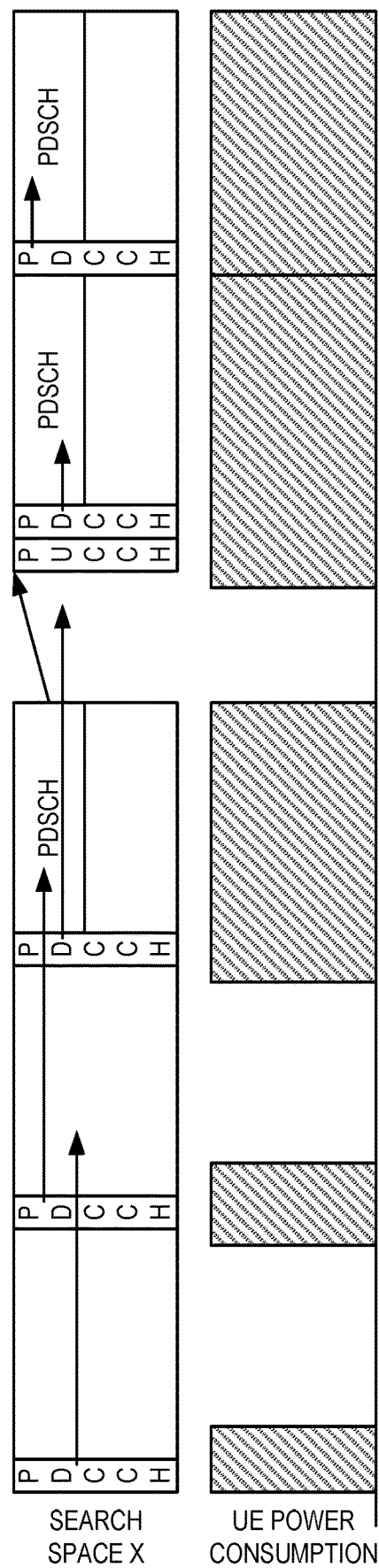
FIG. 10 shows an example in which search space X allows cross-slot scheduling only first (K0>0), a UE receives a Physical Downlink Shared Channel (PDSCH) scheduled by Downlink Control Information (DCI) included in a PDCCH detected in search space X, the UE sends a Hybrid Automatic Repeat Request (HARQ) feedback, and then the UE is allowed to be scheduled with same-slot scheduling (K0=0) in accordance with one embodiment of the present disclosure.

FIG. 10 shows an example where search space X allows cross-slot scheduling only first (K0>0), and the UE receives a PDSCH and sends HARQ feedback, and then the UE is allowed to be scheduled with same-slot scheduling (K0=0).

In the above case, if the UE is looking for DCI with the first set of configured K0 values initially, the UE can go to sleep right after buffering the PDCCH in a given slot because it knows that the PDSCH is expected to be scheduled only in the next slot. Because the UE can know this well in advance (e.g., without having to decode the PDCCH and deciding to shut-off or stay on), the opportunity for saving power can be relatively higher.

Depending on the base station (e.g., gNB) scheduling decision (e.g., can be based on traffic/delay requirements/load), once the UE is allowed to use the second set of K0 values, the UE may not be able to go to sleep right after buffering the PDCCH in a given slot because it has to decode the PDCCH and then determine whether to shut-off or stay on. Thus, there can also be opportunities of energy savings if the UE can finish the data transmission and reception quicker and go back to only monitor PDCCH associated with the first set of K0 values.

In some embodiments, a UE can start to look for DCI in search space X using a first set of K0 values. The UE gets scheduled with a PDSCH in search space X, the UE can report a particular feedback (e.g., HARQ-ACK), and the UE can start looking for DCI in search space X and is allowed to use a second set of K0 values.

Figure 11:
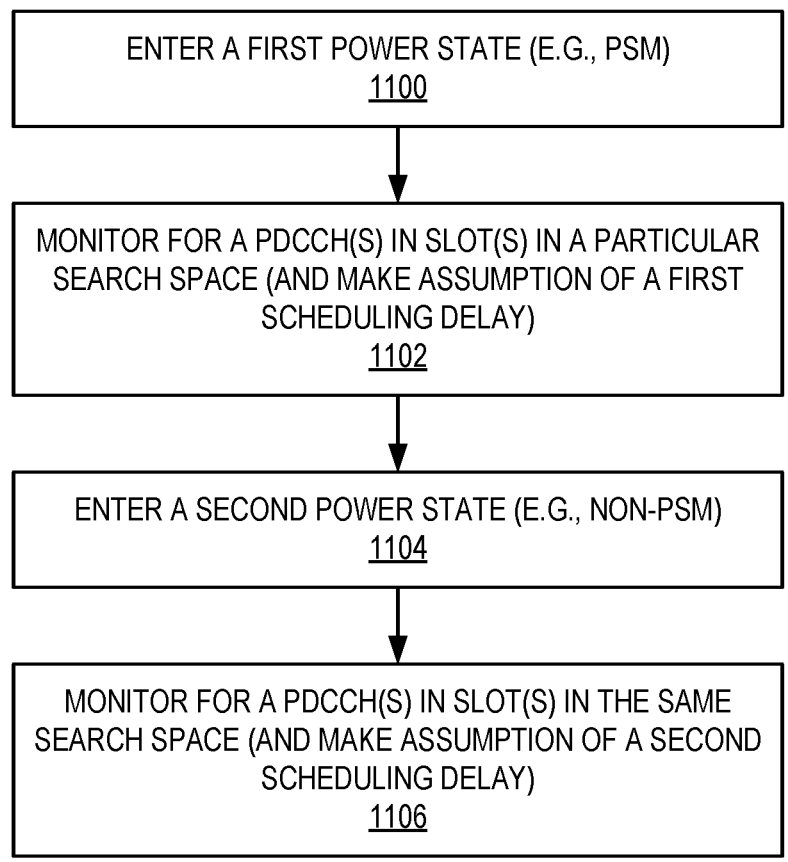
FIG. 11 is a flow chart that illustrates the operation of a UE in which the UE transitions between different power modes in which different scheduling delays are used in accordance with some embodiments of the present disclosure.

In some embodiments, a UE looks for search space X with a first set of K0 values when in PSM mode, and the UE looks for search space X with second set of K0 values when in non-PSM mode. The number of monitoring occasions after which the transition from non-PSM to PSM is made can be lower than the number of monitoring slots without PDSCH after which the UE falls back into DRX. FIG. 11 is a flow chart that illustrates the operation of the UE in this regard. As illustrated, the UE enters a first power mode (e.g., a PSM) (step 1100). While in the first power mode, the UE monitors for PDCCH(s) in a slot(s) in a particular search space (step 1102). The first power mode is associated with a first minimum K0 value (or a first set of K0 values, e.g., defined by a minimum K0 value). As discussed above, the UE assumes that PDSCH(s) scheduled by the DCI in the PDCCH(s) detected in the search space have a scheduling delay that is equal to or greater than the first minimum K0 value (or that is one of the first set of K0 values, e.g., defined by the first minimum K0 value) and, as discussed above, can take certain actions based on that assumption that impact power consumption. Sometime thereafter, the UE enters (e.g., switches to) a second power mode (e.g., a non-PSM) (step 1104). The second power mode is associated with a second minimum K0 value (or a second set of K0 values, e.g., defined by the second minimum K0 value) that is different than the first minimum K0 value. As discussed below, the UE enters the second power mode upon determining that it should transition from the first power mode to the second power mode (e.g., based on any one or any combination of various criteria, as described below). In this manner, the UE determines that it is to switch from the assumption of the first scheduling delay associated with the first power mode and the second scheduling delay associated with the second power mode. While in the second power mode, the UE monitors for PDCCH(s) in a slot(s) in the same search space (step 1106). As discussed above, the UE assumes that PDSCH(s) scheduled by the DCI in the PDCCH(s) detected in the search space have a scheduling delay that is equal to or greater than the second minimum K0 value (or that is one of the second set of K0 values, e.g., defined by the second minimum K0 value) and, as discussed above, can take certain actions based on that assumption that impact power consumption.

The UE can be expected to transition to PSM from non-PSM mode based on one or more of the following criteria:

UE transmits ACK for a PDSCH scheduled by PDCCH in Synchronization Signal (SS) X;

UE receives a message scheduled via SS X to transition from PSM to regular mode;

After the end of the current DRX cycle;

At the beginning of Onduration.

Transition from non-PSM to PSM can be based on a timer, and expiration of the timer can be dependent on lack of receiving PDCCH in a configured number of monitoring occasions. Additional transition criteria, e.g. the criteria described with respect to FIG. 7, may also be used.

In particular embodiments, search space X is a UE-specific search space. Search space X is associated with a first set of K0 values when in PSM mode. Search space X is associated with second set of K0 values when in non-PSM mode.

PDCCH transmission according to search space X is performed using a first set of K0 values when in PSM mode. PDCCH transmission according to search space X is performed using a second set of K0 values when in non-PSM mode.

Search space X is associated with a first set of K0 values, and the UE sends an ACK for a DCI in the search space, and then UE looks for DCI in the search space and then search space X is associated with second set of K0 values. In other words, in some embodiments, the UE monitors for a PDCCH in search space X with the assumption of the first set of K0 values. Upon detecting a PDCCH and receiving the corresponding PDSCH scheduled by the DCI contained in the PDCCH, the UE sends an ACK. Thereafter, the UE monitors for a PDCCH(s) in later slot(s) in the same search space X with the assumption of the second set of K0 values.

UE looks for DCI in search space X and applies only a first set of K0 values, and the UE sends an ACK for the DCI in the search space, and then UE looks for DCI in the search space and can apply a first and second set of K0 values for search space X. In other words, in some embodiments, the UE monitors for a PDCCH in search space X with the assumption of the first set of K0 values. Upon detecting a PDCCH and receiving the corresponding PDSCH scheduled by the DCI contained in the PDCCH, the UE sends an ACK. Thereafter, the UE monitors for a PDCCH(s) in later slot(s) in the same search space X with the assumption of both the first and second sets of K0 values.

The first set of K0 values can be K0>0. The second set of K0 values can include K0=0. The first set of K0 values can be K0>X, where X can be UE-capability signaling, with potential dependencies on numerology, etc. Second set of K0 values can include K0<=X, where X can be UE-capability signaling, with potential dependencies on numerology, etc.

Figure 12:
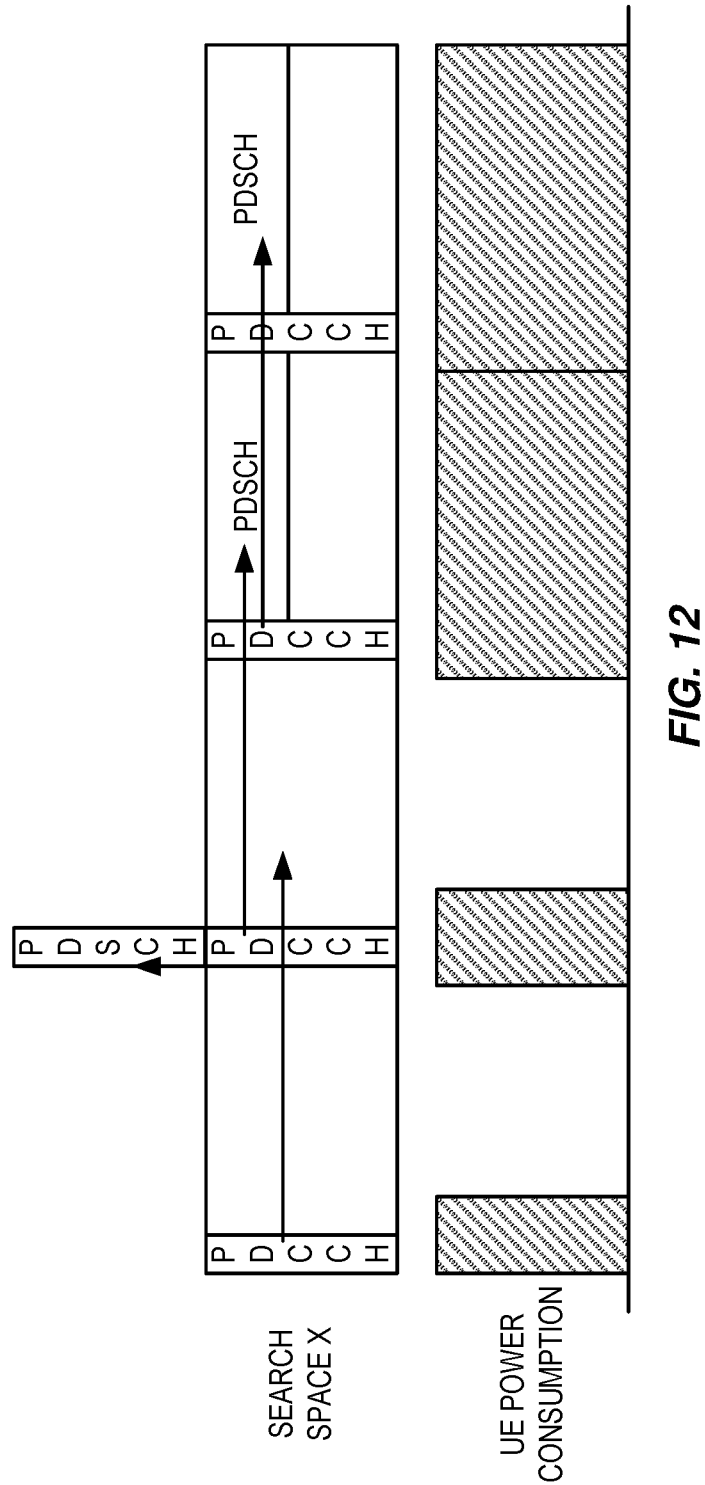
FIGS. 12 and 13 illustrate examples with both cross-slot scheduling and restricted same-slot scheduling that can reduce power consumption in accordance with some embodiments of the present disclosure.
Figure 13:
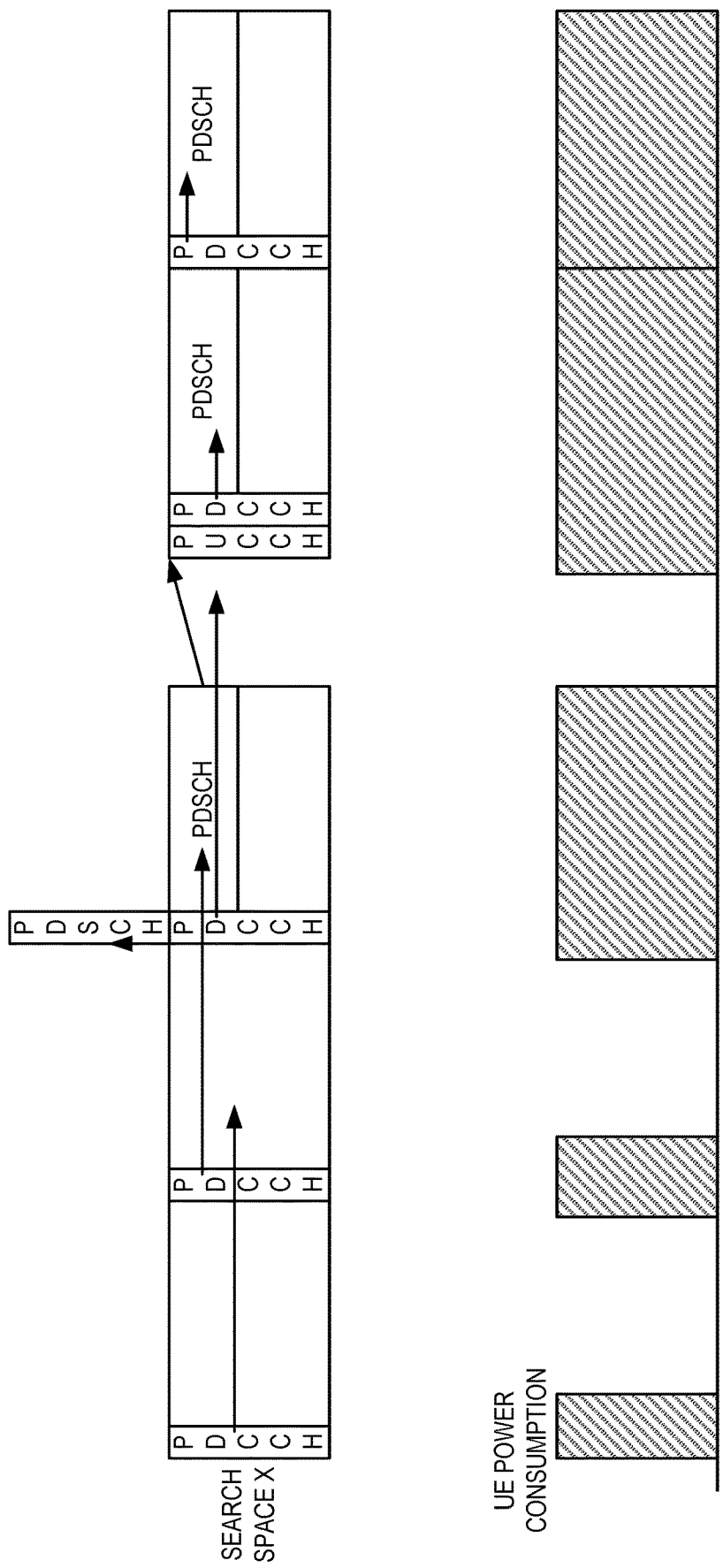

The embodiments described above can be applied for all scheduling cases. Additionally, PDSCH can be scheduled in the symbols where PDCCH is monitored, without the above K0>1 restriction when K0>1 is being used for other locations of PDSCH with respect to PDCCH. Additionally, PDSCH can be scheduled in the symbols adjoining those where PDCCH is monitored, without the above K0>1 restriction when K0>1 is being used for other locations of PDSCH with respect to PDCCH. This allows low data rate or narrow-in-time PDSCH to be scheduled without significant additional power consumption, as shown in FIGS. 12 and 13 for both cases.

For the embodiments described above, in some scenarios, UE-side assistance information can be beneficial for the network. For example, the UE can describe its preference for a preferred set of K0 values in terms of power-savings profile.

Minimum k0 capability that can enable power savings;

UE-indicated preferred K0 values;

UE-indicated Slot Length Indicator Values (SLIVs);

UE-indicated SLIVs for Type A PDSCH mapping and/or a first CORESET and/or search space configuration;

UE-indicated SLIVs for Type B PDSCH mapping and/or a first CORESET and/or search space configuration.

The K0 values can typically be indicated through SLIVs. In certain cases, a UE can indicate that it can reduce power consumption by value A if a first set of SLIVs is configured with a first CORESET/search space configuration, and it can reduce power consumption by value B if a second set of SLIVs is configured with a second CORESET/search space configuration. The UE can indicate multiple such sets that a gNB can utilize in making its scheduling decisions.

A UE may indicate a preferred span (continuous symbols in which PDCCH is monitored) and information related to SLIVs associated with the preferred span. For example, the UE can indicate that it can prefer for reduced power consumption one or more of following configurations:

A first configuration: a span of two (2) symbols, monitoring periodicity of fourteen (14) symbols, and SLIVs corresponding to K0=0, and length of PDSCH allocation=two (2) symbols, and K0>1, and length of PDSCH between two (2) and fourteen (14) symbols.

A second configuration: a span of one (1) symbol, monitoring periodicity of fourteen (14) symbols, and SLIVs corresponding to K0>1, and length of PDSCH between two (2) and fourteen (14) symbols.

A third configuration: a span of three (3) symbols, monitoring periodicity of fourteen (14) symbols, and SLIVs corresponding to K0=1 with length of PDSCH allocation=four (4) symbols, and K0>1 with length of PDSCH between two (2) and fourteen (14) symbols.

The UE can also indicate a priority order or additional information that the network can use to make suitable scheduling choices while accounting for a UE power consumption characteristic.

In particular embodiments, the first and second set of K0 values are determined based on UE indication. UE indication can include a capability signaling indicating a first K0 value threshold corresponding to a first power saving profile and a second K0 value threshold corresponding to a first power saving profile. The capability signaling indication can be dependent on the supported numerology (Subcarrier Spacing (SCS)) with dependency on only PDSCH numerology, or PDCCH and PDSCH numerologies.

Figure 14:
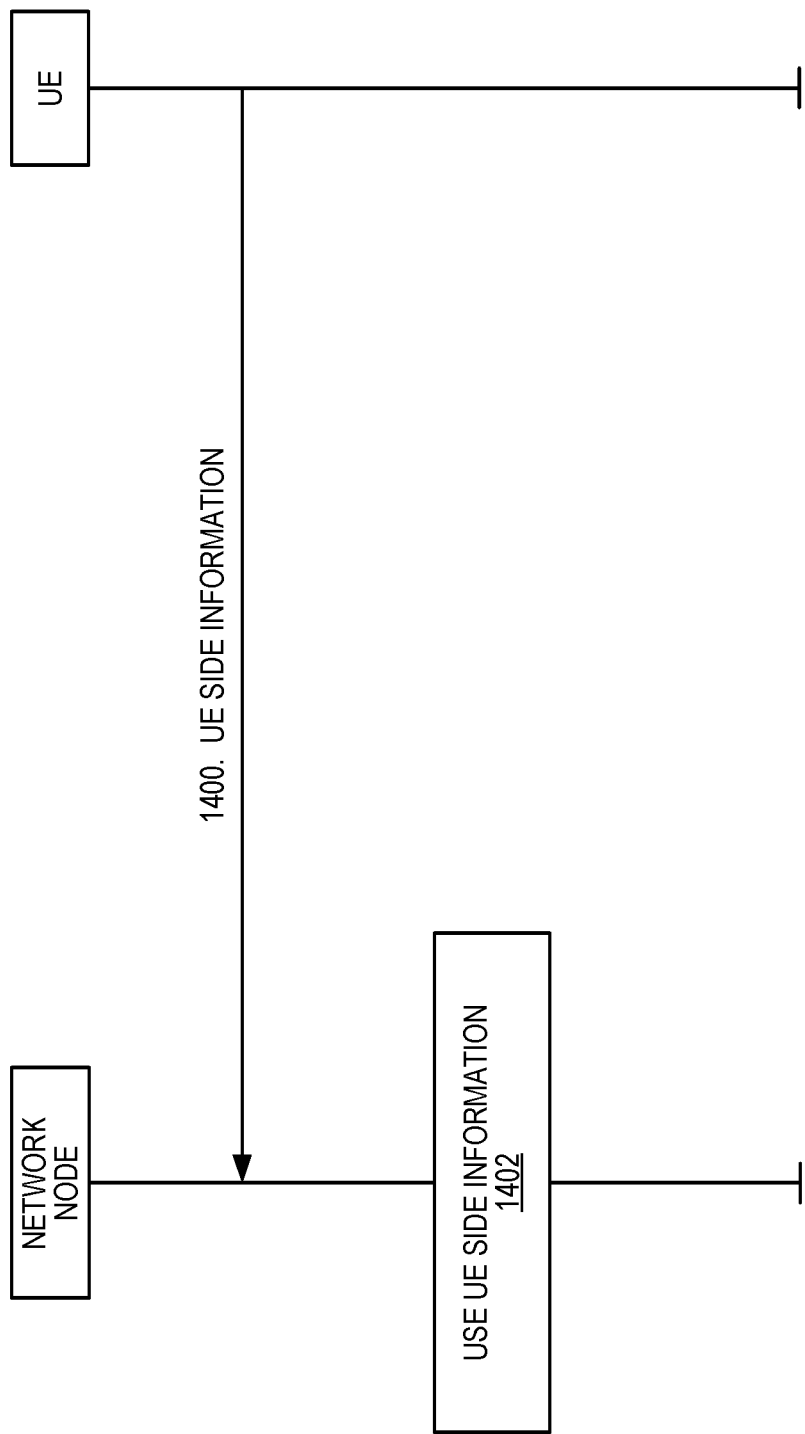
FIG. 14 illustrates the operation of a UE and network node (e.g., a base station) in which the UE provides UE capability information or a UE indication to the network node in accordance with some embodiments of the present disclosure.

In this regard, FIG. 14 illustrates the operation of a UE and a network node (e.g., a base station) in which the UE provides UE capability information or a UE indication to the network node in accordance with some embodiments described herein. As illustrated, the UE provides UE side information (e.g., UE capability information or a UE indication) to the network node (step 1400). Examples of the types of information that may be provided from the UE to the network node are described above and are applicable here. The network node uses the UE side information, e.g., to make appropriate scheduling decisions for the UE (step 1402), in accordance with the embodiments described above.

When an uplink grant is transmitted to the UE in PSM, the UE can stay in PSM mode or can also be configured to switch to non-PSM (e.g., in accordance with the embodiments described above with respect to downlink scheduling).

Figure 15:
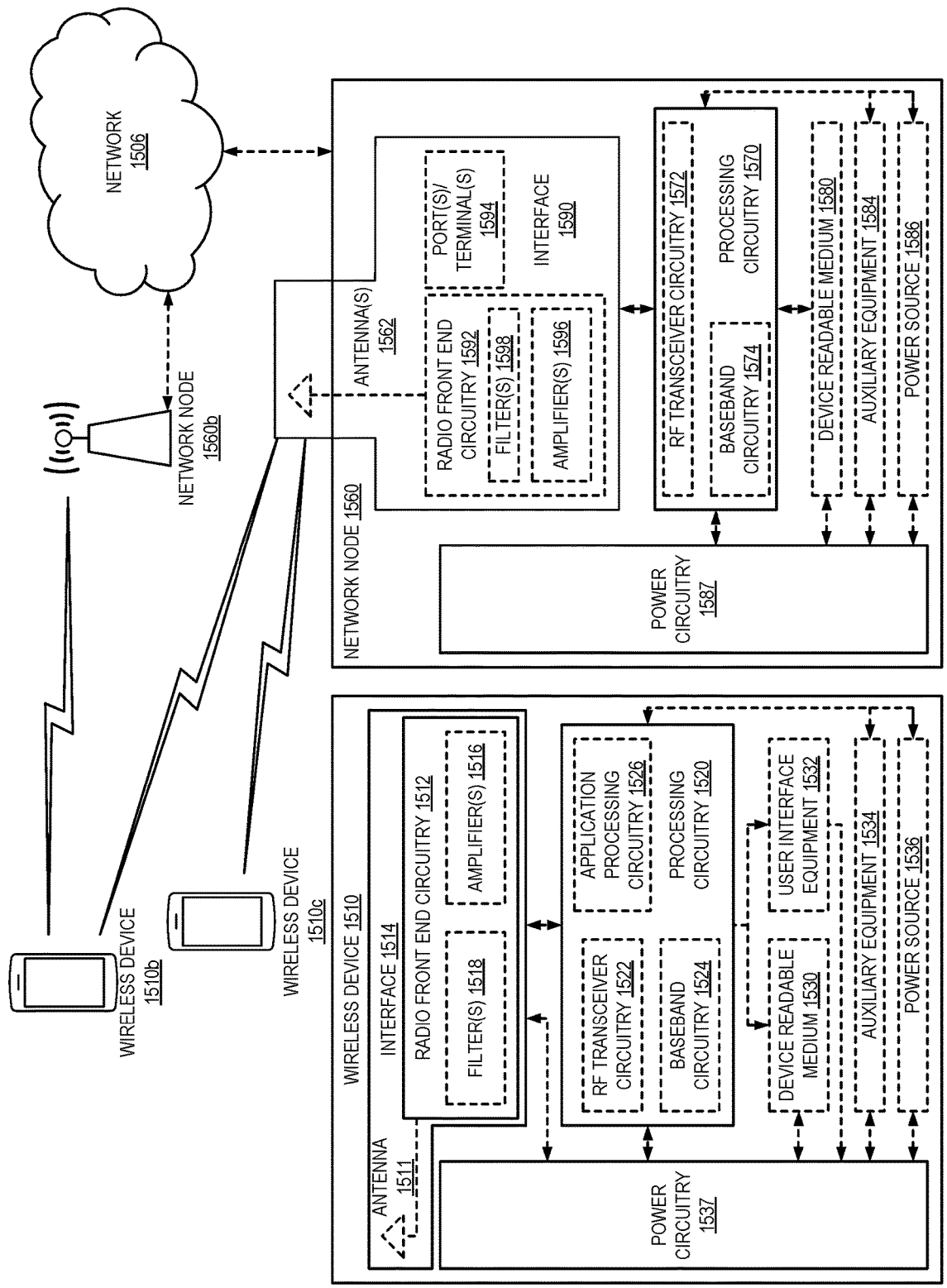
FIG. 15 illustrates an example wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and Wireless Device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple Random Access Memory (RAM) modules).

Similarly, network node 1560 may be composed of multiple physically separate components (e.g., a Node B component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, network node 1560 may be configured to support multiple Radio Access Technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, Wideband Code Division Multiple Access (WCDMA), LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a System on a Chip (SOC).

In some embodiments, processing circuitry 1570 may include one or more of RF transceiver circuitry 1572 and baseband processing circuitry 1574. In some embodiments, RF transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1592 and may be any type of antenna capable of transmitting and receiving data and/or signals wirelessly. In some embodiments, antenna 1562 may comprise one or more omni-directional, sector or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, WD refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle-mounted wireless terminal device, etc. A WD may support Device-to-Device (D2D) communication, for example by implementing a Third Generation Partnership Project (3GPP) standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a Machine-to-Machine (M2M) device, which may in a 3GPP context be referred to as an MTC device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1512 is connected to antenna 1511 and processing circuitry 1520 and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510 and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a Universal Serial Bus (USB) port, a headphone interface, or other output circuitry. Using one or more input and output interfaces, devices, and circuits, of user interface equipment 1532, WD 1510 may communicate with end users and/or the wireless network and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
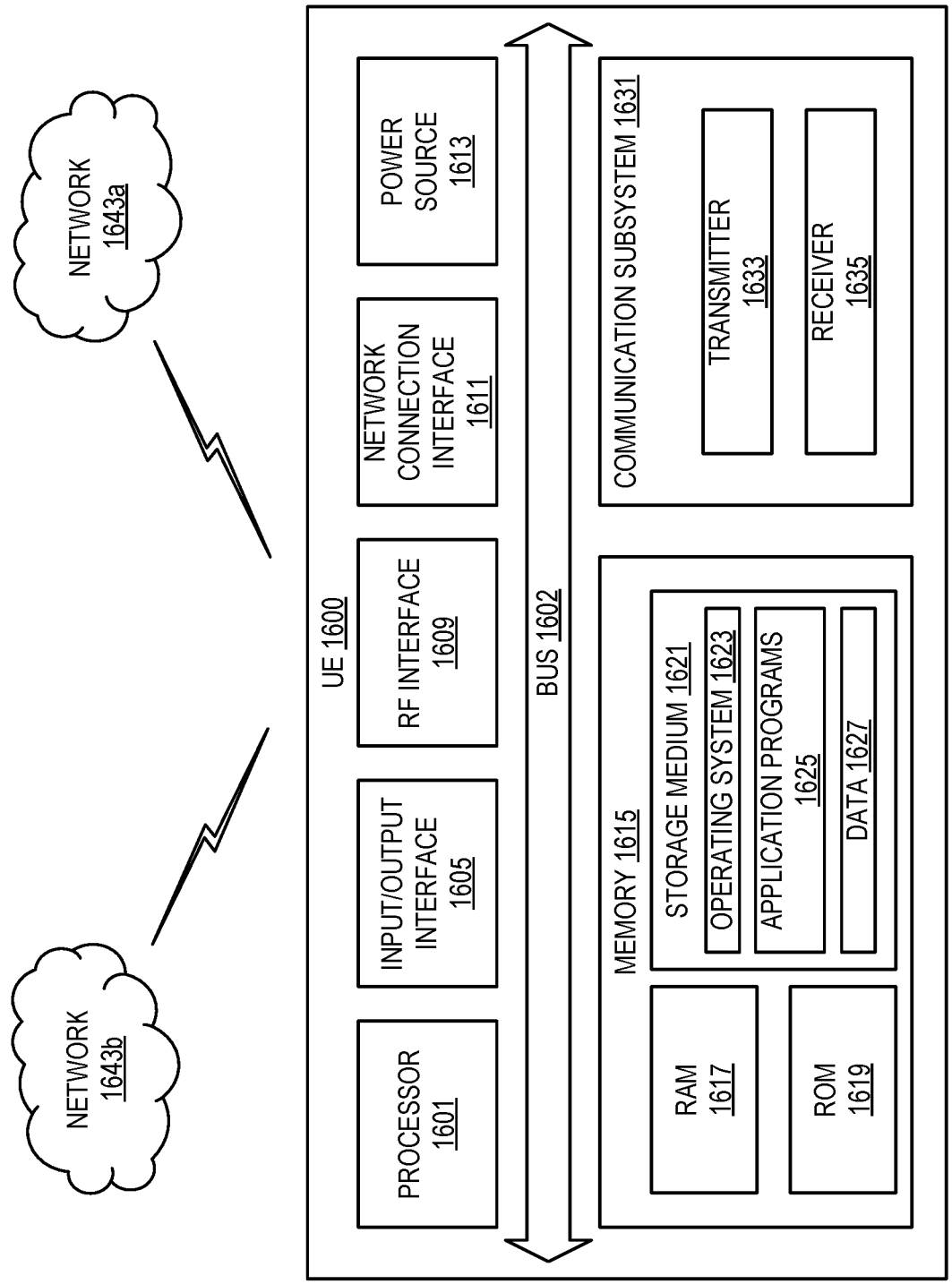
FIG. 16 illustrates one embodiment of a UE in accordance with various aspects described herein.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1600 may be any UE identified by the 3GPP, including a NB-IoT UE, a Machine Type Communication (MTC) UE, and/or an enhanced MTC (eMTC) UE. UE 1600, as illustrated in FIG. 16, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, RF interface 1609, network connection interface 1611, memory 1615 including RAM 1617, ROM 1619, and storage medium 1621 or the like, communication subsystem 1631, power source 1613, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 1601 may include two CPUs. Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a LAN, a WAN, a computer network, a wireless network, a telecommunications network, another like network or any combination thereof. For example, network 1643a may comprise a WiFi network. Network connection interface 1611 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic Input and Output (I/O), startup, or reception of keystrokes from a keyboard that are stored in a non-volatile memory. Storage medium 1621 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as Redundant Array of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module (SIM) or a Removable User Identity Module (RUIM), other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a Radio Access Network (RAN) according to one or more communication protocols, such as IEEE 802.16, Code Division Multiple Access (CDMA), WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 1631 may include cellular communication, WiFi communication, Bluetooth communication, and GPS communication. Network 1643b may encompass wired and/or wireless networks such as a LAN, a WAN, a computer network, a wireless network, a telecommunications network, another like network or any combination thereof. For example, network 1643b may be a cellular network, a Wi-Fi network, and/or a near-field network. Power source 1613 may be configured to provide Alternating Current (AC) or Direct Current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
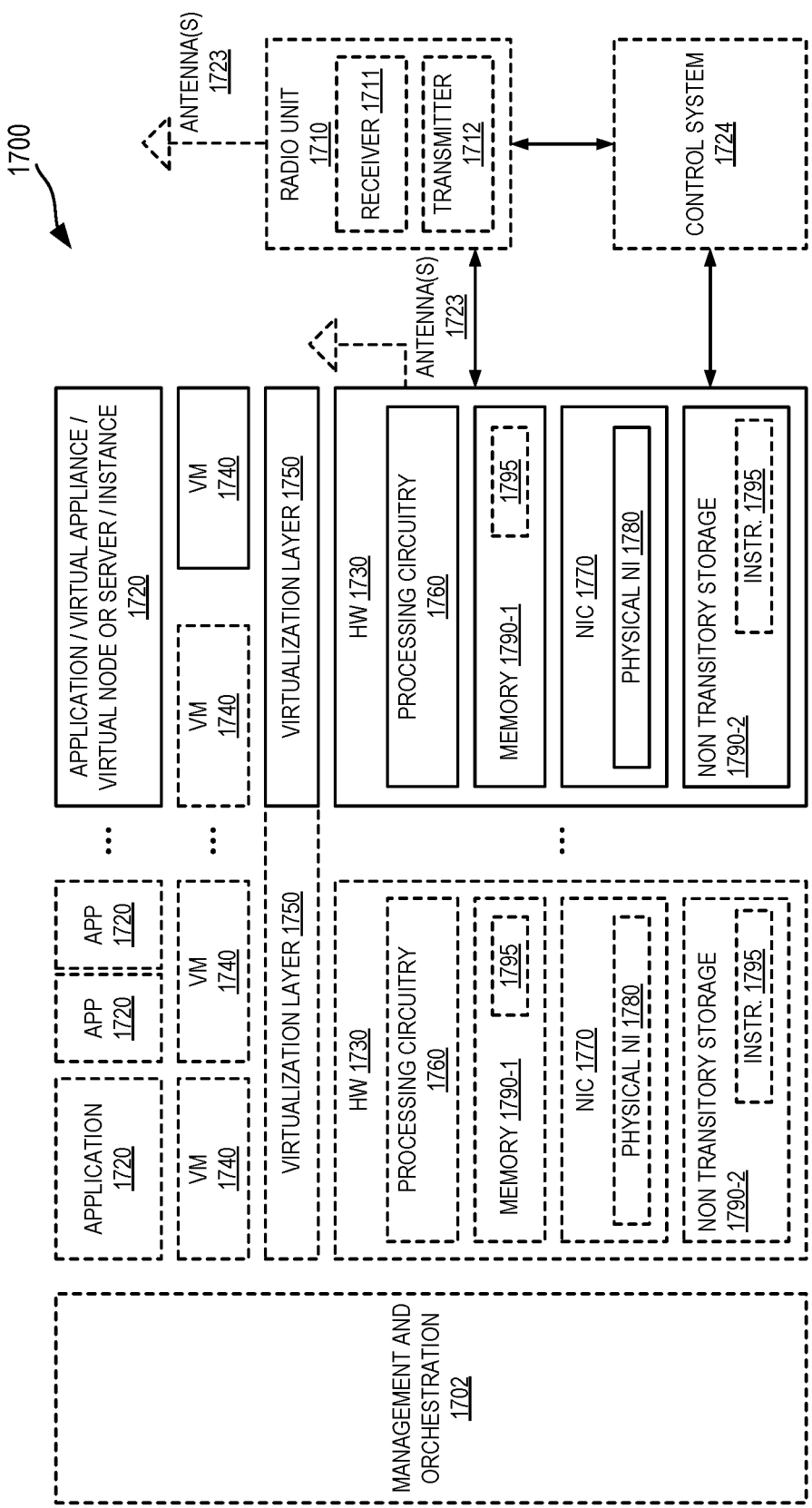
FIG. 17 is a schematic block diagram illustrating a virtualization environment in which functions implemented by some embodiments may be virtualized.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be Commercial Off-the-Shelf (COTS) processors, dedicated ASICs, or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more Network Interface Controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a Virtual Machine Monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 1723 and may implement some functions via virtualization. Alternatively, hardware 1730 may be part of a larger cluster of hardware (e.g., such as in a data center or CPE) where many hardware nodes work together and are managed via Management and Orchestration (MANO) 1702, which, among others, oversees lifecycle management of applications 1720.

Virtualization of the hardware is in some contexts referred to as Network Function Virtualization (NFV). NFV may be used to consolidate many network equipment types onto industry standard high-volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate Virtual Network Elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 1710 that each include one or more transmitters 1712 and one or more receivers 1711 may be coupled to one or more antennas 1723. Radio units 1710 may communicate directly with hardware nodes 1730 via one or more appropriate network interfaces and may be used in combination with the virtual components to provide a virtual node with radio capabilities, such as a radio access node or a base station.

In some embodiments, some signaling can be effected with the use of control system 1724 which may alternatively be used for communication between the hardware nodes 1730 and radio units 1710.

Figure 18:
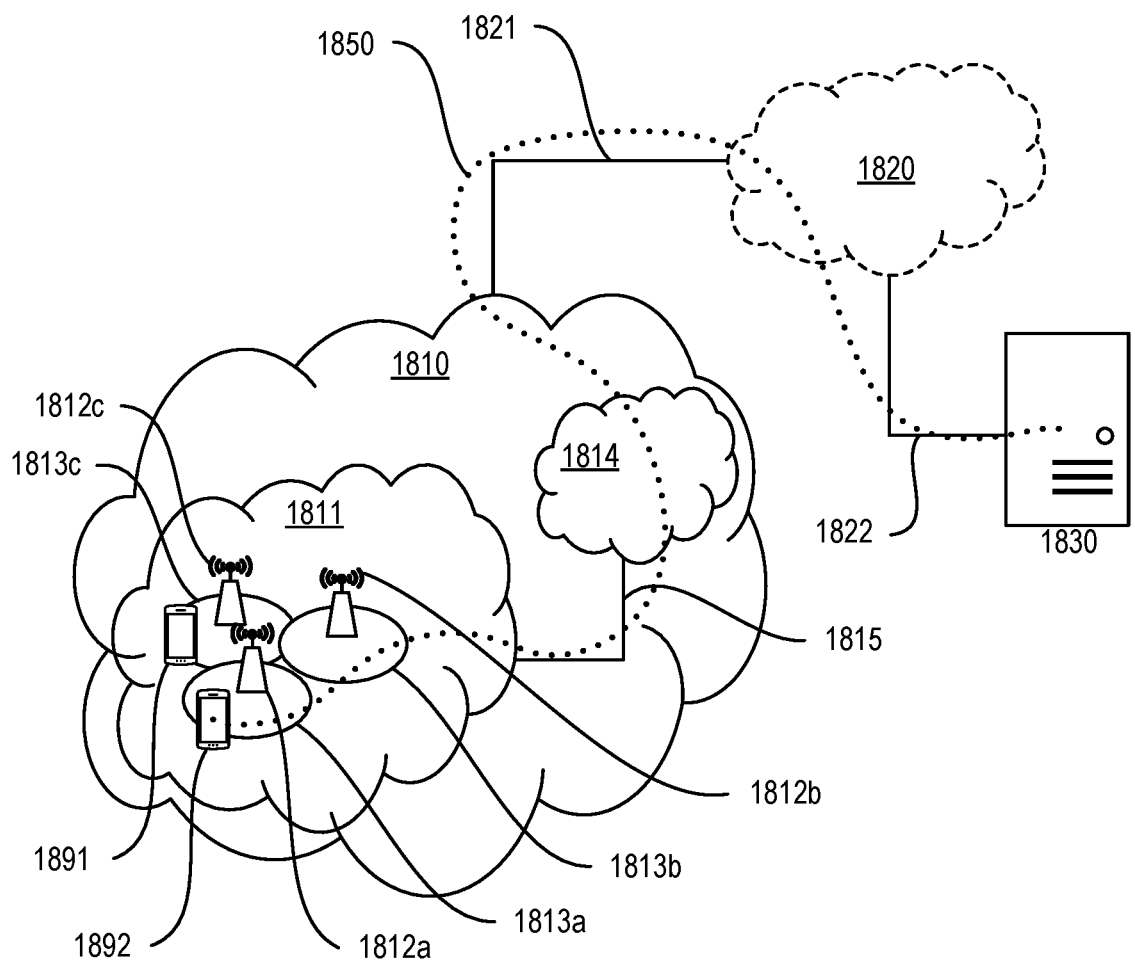
FIG. 18 illustrates a communication system in which embodiments of the present disclosure may be implemented, where the communication system includes telecommunication network, which comprises an access network and a core network.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as Node Bs, eNBs, gNBs, or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an Over-the-Top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

Figure 19:
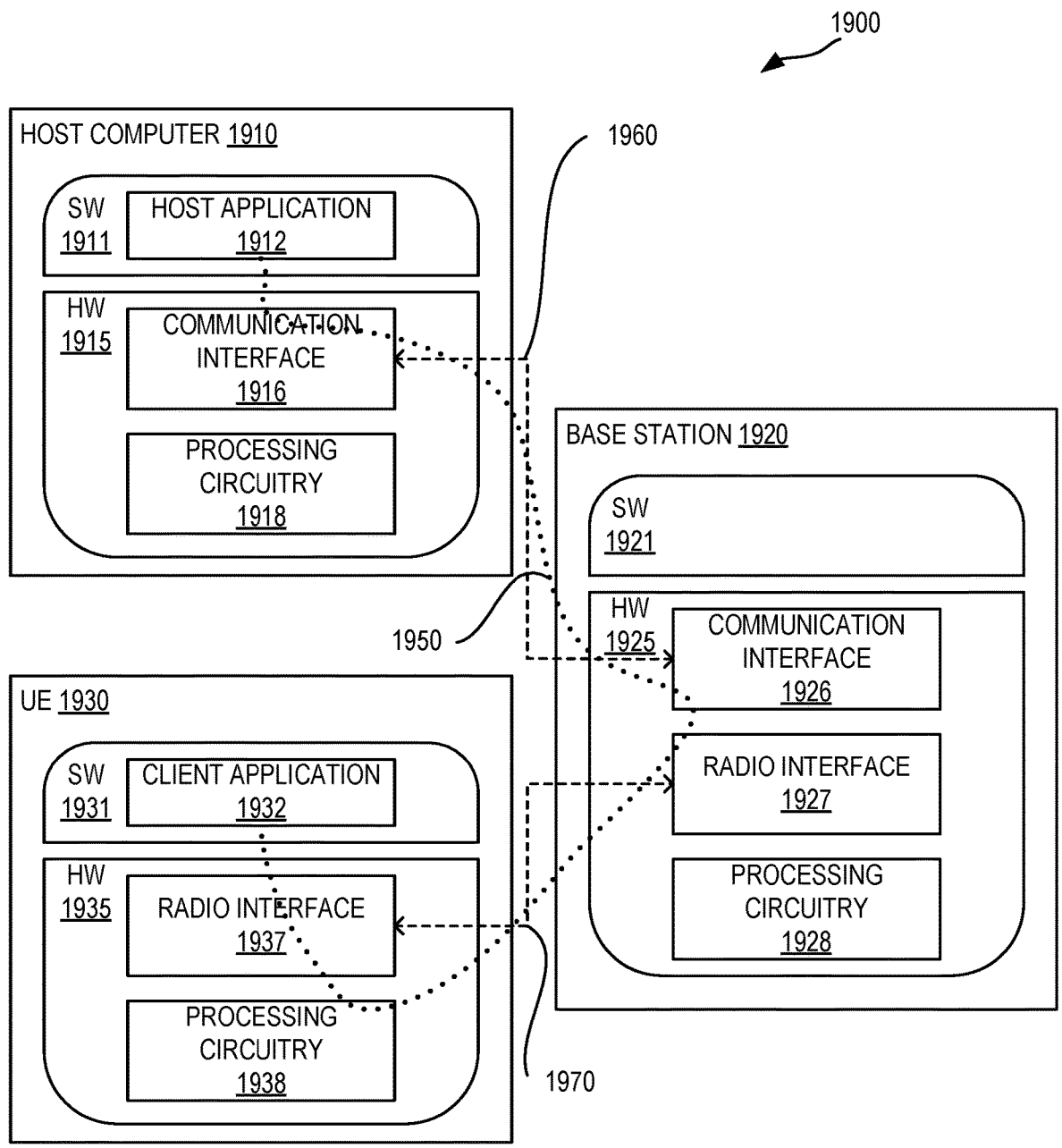
FIG. 19 illustrates example implementations in accordance with an embodiment of the UE, base station, and host computer of FIG. 18.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the latency and power consumption and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some example embodiments of the present disclosure are as follows:

Group A Embodiments

Embodiment 1: A method performed by a wireless device for cross slot scheduling, the method comprising: monitoring a downlink control channel for downlink scheduling information, wherein any received downlink scheduling can schedule a downlink transmission to occur after a first scheduling delay; receiving first downlink scheduling information for a first data transmission according to the first scheduling delay; receiving the first data transmission at the scheduled time; and monitoring the downlink control channel for downlink scheduling information, wherein any received downlink scheduling can schedule a downlink transmission to occur after a second scheduling delay and the second scheduling delay is less than the first scheduling delay.

Embodiment 2: The method of embodiment 1, wherein monitoring the downlink control channel assuming the first scheduling delay comprises monitoring a first search space and monitoring the downlink control channel assuming the second scheduling delay comprises monitoring a second search space.

Embodiment 3: The method of any one of embodiments 1-2, wherein monitoring the downlink control channel assuming the second scheduling delay is performed after sending a HARQ response to the first received data transmission.

Embodiment 4: The method of embodiment 3, wherein monitoring the downlink control channel assuming the second scheduling delay is performed after sending a HARQ ACK response to the first received data transmission.

Embodiment 5: The method of any one of embodiments 1-4, further comprising after monitoring the downlink control channel assuming the second scheduling delay for a threshold amount of time, reverting to monitoring the downlink control channel assuming the first scheduling delay.

Embodiment 6: The method of embodiment 5, wherein the threshold amount of time corresponds to the end of a DRX onDuration.

Embodiment 7: The method of any one of embodiments 1-6, wherein the first scheduling delay is greater than one slot and the second scheduling delay is same slot.

Embodiment 8: The method of any of the previous embodiments, further comprising: providing user data; and forwarding the user data to a host computer via the transmission to the base station.

Group B Embodiments

Embodiment 9: A method performed by a base station for cross slot scheduling, the method comprising: sending first downlink scheduling information to a wireless device, the first downlink scheduling information including a first scheduling delay; transmitting a first data transmission to the wireless device according to the first scheduling information; and sending second downlink scheduling information to the wireless device, the second downlink scheduling information including a second scheduling delay and the second scheduling delay is less than the first scheduling delay.

Embodiment 10: The method of embodiment 9, wherein sending the first downlink scheduling information comprises sending the first downlink scheduling information in a first search space and sending the second downlink scheduling information comprises sending the second downlink scheduling information in a second search space.

Embodiment 11: The method of any one of embodiments 9-10, wherein sending second downlink scheduling information is performed after receiving a HARQ response to the first data transmission.

Embodiment 12: The method of embodiment 11, wherein sending second downlink scheduling information is performed after receiving a HARQ ACK response to the first data transmission.

Embodiment 13: The method of any one of embodiments 1-6, wherein the first scheduling delay is greater than one slot and the second scheduling delay is same slot.

Embodiment 14: The method of any of the previous embodiments, further comprising: obtaining user data; and forwarding the user data to a host computer or a wireless device.

Group C Embodiments

Embodiment 15: A wireless device for cross slot scheduling, the wireless device comprising: processing circuitry configured to perform any of the steps of any of the Group A embodiments; and power supply circuitry configured to supply power to the wireless device.

Embodiment 16: A base station for cross slot scheduling, the base station comprising: processing circuitry configured to perform any of the steps of any of the Group B embodiments; power supply circuitry configured to supply power to the wireless device.

Embodiment 17: A user equipment (UE) for cross slot scheduling, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 18: A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Embodiment 19: The communication system of the pervious embodiment further including the base station.

Embodiment 20: The communication system of the previous 2 embodiments, further including the UE, wherein the UE is configured to communicate with the base station.

Embodiment 21: The communication system of the previous 3 embodiments, wherein: the processing circuitry of the host computer is configured to execute a host application, thereby providing the user data; and the UE comprises processing circuitry configured to execute a client application associated with the host application.

Embodiment 22: A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Embodiment 23: The method of the previous embodiment, further comprising, at the base station, transmitting the user data.

Embodiment 24: The method of the previous 2 embodiments, wherein the user data is provided at the host computer by executing a host application, the method further comprising, at the UE, executing a client application associated with the host application.

Embodiment 25: A user equipment (UE) configured to communicate with a base station, the UE comprising a radio interface and processing circuitry configured to performs any of the previous 3 embodiments.

Embodiment 26: A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 27: The communication system of the previous embodiment, wherein the cellular network further includes a base station configured to communicate with the UE.

Embodiment 28: The communication system of the previous 2 embodiments, wherein: the processing circuitry of the host computer is configured to execute a host application, thereby providing the user data; and the UE's processing circuitry is configured to execute a client application associated with the host application.

Embodiment 29: A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Embodiment 30: The method of the previous embodiment, further comprising at the UE, receiving the user data from the base station.

Embodiment 31: A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 32: The communication system of the previous embodiment, further including the UE.

Embodiment 33: The communication system of the previous 2 embodiments, further including the base station, wherein the base station comprises a radio interface configured to communicate with the UE and a communication interface configured to forward to the host computer the user data carried by a transmission from the UE to the base station.

Embodiment 34: The communication system of the previous 3 embodiments, wherein: the processing circuitry of the host computer is configured to execute a host application; and the UE's processing circuitry is configured to execute a client application associated with the host application, thereby providing the user data.

Embodiment 35: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 36: A method implemented in a communication system including a host computer, a base station and a user equipment (UE), the method comprising: at the host computer, receiving user data transmitted to the base station from the UE, wherein the UE performs any of the steps of any of the Group A embodiments.

Embodiment 37: The method of the previous embodiment, further comprising, at the UE, providing the user data to the base station.

Embodiment 38: The method of the previous 2 embodiments, further comprising: at the UE, executing a client application, thereby providing the user data to be transmitted; and at the host computer, executing a host application associated with the client application.

Embodiment 39: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 40: A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 41: The communication system of the previous embodiment further including the base station.

Embodiment 42: The communication system of the previous 2 embodiments, further including the UE, wherein the UE is configured to communicate with the base station.

Embodiment 43: The communication system of the previous 3 embodiments, wherein: the processing circuitry of the host computer is configured to execute a host application; the UE is configured to execute a client application associated with the host application, thereby providing the user data to be received by the host computer.

Embodiment 44: A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Embodiment 45: The method of the previous embodiment, further comprising at the base station, receiving the user data from the UE.

Embodiment 46: The method of the previous 2 embodiments, further comprising at the base station, initiating a transmission of the received user data to the host computer.

Embodiment 47: A user equipment for communication with a cellular telecommunications network, the user equipment comprising: processing circuitry configured to: define at least two search spaces including a first search space and a second search space, wherein the first search space has a first minimum K0 value and the second search space has a second minimum K0 value that is different than the first minimum K0 value; and switch the PDCCH monitoring between the at least two search spaces.

Embodiment 48: A user equipment for communication with a cellular telecommunications network, the user equipment comprising: processing circuitry configured to: define a first set of K0 values and a second set of K0 values, wherein both the first and the second sets of K0 values are for a first search space; and switch between the first set and the second set based on an implicit or explicit dynamic indication.

Abbreviations

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledgement
AP Access Point
ASIC Application Specific Integrated Circuit
ATM Asynchronous Transfer Mode
BCH Broadcast Channel
BS Base Station
BSC Base Station Controller
BTS Base Transceiver Station
BW Bandwidth
BWP Bandwidth Part
CD Compact Disk
CDMA Code Division Multiple Access
CDRX Connected mode DRX
CORESET Control Resource Set
COTS Commercial Off-the-Shelf
CPE Customer Premise Equipment
CPU Central Processing Unit
CRC Cyclic Redundancy Check
C-RNTI Cell Radio Network Temporary Identifier
CS-RNTI Configured Scheduling Radio Network Temporary Identifier
D2D Device-to-Device
DAI Downlink Assignment Index
DAS Distributed Antenna System
DC Direct Current
DCI Downlink Control Information
DIMM Dual In-line Memory Module
DL Downlink
DL-SCH Downlink Shared Channel
DRX Discontinuous Reception
DSP Digital Signal Processor
eMBB Enhanced Mobile Broadband
eMTC Enhanced Machine Type Communication
eNB Enhanced or Evolved Node B
EPROM Erasable Programmable Read Only Memory
E-SMLC Evolved Serving Mobile Location Center
FPGA Field Programmable Gate Array
GHz Gigahertz
gNB New Radio Base Station
GPS Global Positioning System
GSM Global System for Mobile Communications
HARQ Hybrid Automatic Repeat Request
HDDS Holographic Digital Data Storage
I/O Input and Output
IoT Internet of Things
IP Internet Protocol
LAN Local Area Network
LTE Long Term Evolution
M2M Machine-to-Machine
MAC Medium Access Control
MANO Management and Orchestration
MCE Multi-Cell/Multicast Coordination Entity
MDT Minimization of Drive Tests
MIMO Multiple Input Multiple Output
MME Mobility Management Entity
ms Millisecond
MSC Mobile Switching Center
MSR Multi-Standard Radio
MTC Machine Type Communication
NACK Negative Acknowledgment
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-the-Top
PBCH Physical Broadcast Channel
PCH Paging Channel
PDA Personal Digital Assistant
PDCCH Physical Downlink Control Channel
PDSCH Physical Downlink Shared Channel
PHY Physical
PRACH Physical Random Access Channel
PRB Physical Resource Block
P-RNTI Paging Radio Network Temporary Identifier
PROM Programmable Read Only Memory
PSM Power Savings Mode
PSTN Public Switched Telephone Network
PUCCH Physical Uplink Control Channel
PUSCH Physical Uplink Shared Channel
RACH Random Access Channel
RAID Redundant Array of Independent Disks
RAM Random Access Memory
RAN Radio Access Network
RAR Random Access Response
RA-RNTI Random Access Radio Network Temporary Identifier
RAT Radio Access Technology
RB Resource Block
RF Radio Frequency
RNC Radio Network Controller
RNTI Radio Network Temporary Identifier
ROM Read Only Memory
RRC Radio Resource Control
RRH Remote Radio Head
RRU Remote Radio Unit
RTT Round Trip Time
RUIM Removable User Identity Module
SCS Subcarrier Spacing
SDRAM Synchronous Dynamic Random Access Memory
SIM Subscriber Identity Module
SI-RNTI System Information Radio Network Temporary Identifier
SLIV Slot Length Indicator Value
SOC System on a Chip
SON Self-Organizing Network
SONET Synchronous Optical Networking
SS Synchronization Signal
TCP Transmission Control Protocol
TPC Transmit Power Control
TS Technical Specification
UE User Equipment
UL Uplink UMTS Universal Mobile Telecommunications System
URLLC Ultra Reliable and Low Latency Communication
USB Universal Serial Bus
V21 Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
VRB Virtual Resource Block
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
monitoring, during a first slot, for a downlink control channel comprising downlink control information that schedules a transmission for the wireless device with an assumption of a first scheduling delay, the first scheduling delay being equal to or exceeding a first value;
determining that the wireless device is to switch from the assumption of the first scheduling delay to an assumption of a second scheduling delay, the second scheduling delay being equal to or exceeding a second value, the second value being less than the first value; and
monitoring, during one or more later slots that occur after the first slot, for a downlink control channel comprising downlink control information that schedules a transmission for the wireless device with the assumption of the second scheduling delay.

2. The method of claim 1, wherein:
monitoring for a downlink control channel comprising downlink control information that schedules a transmission for the wireless device with the assumption of the first scheduling delay comprises monitoring for a downlink control channel comprising downlink control information that schedules a transmission for the wireless device with the assumption of the first scheduling delay in a particular search space; and
monitoring for a downlink control channel comprising downlink control information that schedules a transmission for the wireless device with the assumption of the second scheduling delay comprises monitoring for a downlink control channel comprising downlink control information that schedules a transmission for the wireless device with the assumption of the second scheduling delay in the particular search space.

3. The method of claim 1, wherein:
monitoring for a downlink control channel comprising downlink control information that schedules a transmission for the wireless device with the assumption of the first scheduling delay comprises monitoring for a downlink control channel comprising downlink control information that schedules a transmission for the wireless device with the assumption of the first scheduling delay in a first search space; and
monitoring for a downlink control channel comprising downlink control information that schedules a transmission for the wireless device with the assumption of the second scheduling delay comprises monitoring for a downlink control channel comprising downlink control information that schedules a transmission for the wireless device with the assumption of the second scheduling delay in a second search space that is different than the first search space.

4. The method of claim 3, wherein the first search space is associated with a first bandwidth and the second search space is associated with a second bandwidth, wherein the first bandwidth is smaller than the second bandwidth.

5. The method of claim 1, wherein determining that the wireless device is to switch from the assumption of the first scheduling delay to the assumption of the second scheduling delay comprises determining that the wireless device is to switch from the assumption of the first scheduling delay to the assumption of the second scheduling delay in response to an explicit or implicit indication from a network node.

6. The method of claim 5, wherein the explicit or implicit indication is an explicit indication comprised in downlink control information from the network node.

7. The method of claim 1, wherein:
monitoring, during the first slot, for a downlink control channel comprising downlink control information that schedules a transmission for the wireless device with the assumption of the first scheduling delay comprises monitoring, during the first slot, for a downlink control channel comprising downlink control information that schedules a transmission for the wireless device with the assumption of the first scheduling delay while the wireless device operates in a first power mode that is associated with the first scheduling delay; and
determining that the wireless device is to switch from the assumption of the first scheduling delay to the assumption of the second scheduling delay comprises transitioning from the first power mode to a second power mode associated with the second scheduling delay.

8. The method of claim 7, wherein transitioning from the first power mode to the second power mode associated with the second scheduling delay comprises transitioning from the first power mode to a second power mode associated with the second scheduling delay in response to an indication comprised in downlink control information from a network node.

9. A method performed by a wireless device, the method comprising:
monitoring, during a first slot, for a downlink control channel comprising downlink control information that schedules a transmission for the wireless device with an assumption of a first scheduling delay, the first scheduling delay being equal to or exceeding a first value;
determining that the wireless device is to switch from the assumption of the first scheduling delay to an assumption of a second scheduling delay, the second scheduling delay being equal to or exceeding a second value, the second value being less than the first value, wherein determining that the wireless device is to switch from the assumption of the first scheduling delay to the assumption of the second scheduling delay comprises transitioning from the first power mode to a second power mode associated with the second scheduling delay,
wherein transitioning from the first power mode to the second power mode associated with the second scheduling delay comprises transitioning from the first power mode to a second power mode associated with the second scheduling delay upon sending a Hybrid Automatic Repeat Request, HARQ, Acknowledgement, ACK, for a transmission scheduled by downlink control information comprised in a downlink control channel detected in the first slot; and monitoring, during one or more later slots that occur after the first slot, for a downlink control channel comprising downlink control information that schedules a transmission for the wireless device with the assumption of the second scheduling delay.

10. The method of claim 7, wherein transitioning from the first power mode to the second power mode associated with the second scheduling delay comprises transitioning from the first power mode to a second power mode associated with the second scheduling delay upon expiration of a timer.

11. The method of claim 10, wherein expiration of the timer is dependent on lack of receiving a downlink control channel.

12. The method of claim 10, wherein expiration of the timer is dependent on lack of receiving a downlink control channel in a configured number of monitoring occasions.

13. The method of claim 7, wherein:
the first power mode is a Power Savings Mode, PSM, and the second power mode is a non-PSM; or
the first power mode is a non-PSM and the second power mode is a PSM.

14. The method of claim 13, wherein the PSM is a mode in which only cross-slot scheduling is used, and the non-PSM is a mode in which same-slot scheduling can be used.

15. The method of claim 1, wherein determining that the wireless device is to switch from the assumption of the first scheduling delay to the assumption of the second scheduling delay comprises determining that the wireless device is to switch from the assumption of the first scheduling delay to the assumption with the second scheduling delay upon sending a Hybrid Automatic Repeat Request, HARQ, Acknowledgement, ACK, for a transmission scheduled by downlink control information comprised in a downlink control channel detected in the first slot.

16. The method of claim 1, wherein determining that the wireless device is to switch from the assumption of the first scheduling delay to the assumption of the second scheduling delay comprises determining that the wireless device is to switch from the assumption of the first scheduling delay to the assumption of the second scheduling delay upon expiration of a timer.

17. The method of claim 16, wherein expiration of the timer is dependent on lack of receiving a downlink control channel in a configured number of monitoring occasions.

18. The method of claim 1, wherein the first value is a value that corresponds to a value that is greater than or equal to one slot.

19. The method of claim 18, wherein the first value is a value determined based on a wireless device indication dependent on only physical downlink shared channel numerology, or physical downlink control channel and physical downlink shared channel numerologies.

20. The method of claim 18, further comprising, based on an assumption that downlink scheduling detected on the downlink control channel in the first slot schedules a downlink transmission to the wireless device with the first scheduling delay that exceeds the first value, operating in a low power mode during the first slot when not monitoring the downlink control channel.

21. The method of claim 18, wherein monitoring the downlink control channel during the first slot comprises monitoring the downlink control channel at a beginning portion of the first slot, and the method further comprises:

based on the assumption of the first scheduling delay, operating in a low power mode during the first slot starting at an end of the beginning portion of the first slot during which the downlink control channel is monitored.

22. The method of claim 1, wherein determining that the wireless device is to switch from the assumption of the first scheduling delay to the assumption of the second scheduling delay comprises determining that a downlink control channel comprising downlink control information that schedules a transmission for the wireless device is detected during the first slot.

23. The method of claim 22, wherein the one or more later slots comprise a second slot that immediately follows the first slot.

24. The method of claim 22, wherein the one or more later slots occur after a slot in which the wireless device sends a Hybrid Automatic Repeat Request, HARQ, response for the transmission scheduled by the downlink control information comprised in the downlink control channel detected in the first slot.

25. The method of claim 22, wherein the one or more later slots occur after a slot in which the wireless device sends a Hybrid Automatic Repeat Request, HARQ, Acknowledgement, ACK, for the transmission scheduled by the downlink control information comprised in the downlink control channel detected in the first slot.

26. The method of claim 22, wherein the one or more later slots occur after a slot in which the wireless device detects another downlink control channel that comprises downlink control information that schedules a transmission for the wireless device in accordance with the second scheduling delay.

27. The method of claim 24, further comprising:
in one or more subsequent slots that follow the first slot and precede the one or more later slots, monitoring for a downlink control channel comprising downlink control information that schedules a transmission for the wireless device with the assumption of the first scheduling delay.

28. The method of claim 22, wherein the first slot is during a Discontinuous Reception, DRX, On Duration, and the one or more later slots are all slots that occur later than the first slot in the DRX On Duration.

29. The method of claim 22, further comprising:
switching to monitoring for a downlink control channel comprising downlink control information that schedules a transmission for the wireless device with the assumption of the first scheduling delay or with both the assumption of the first scheduling delay and the assumption of the second scheduling delay.

30. A wireless device comprising:
radio front end circuitry; and
processing circuitry associated with the radio front end circuitry, the processing circuitry configured to cause the wireless device to:
monitor, during a first slot, for a downlink control channel comprising downlink control information that schedules a transmission for the wireless device with an assumption of a first scheduling delay, the first scheduling delay being equal to or exceeding a first value;
determine that the wireless device is to switch from the assumption of the first scheduling delay to an assumption of a second scheduling delay, the second scheduling delay being equal to or exceeding a second value, the second value being less than the first value; and monitor, during one or more later slots that occur after the first slot, for a downlink control channel comprising downlink control information that schedules a transmission for the wireless device with the assumption of the second scheduling delay.

31. The wireless device of claim 30, wherein, in order to cause the wireless device to determine that the wireless device is to switch from the assumption of the first scheduling delay to the assumption of the second scheduling delay, the processing circuitry is further configured to cause the wireless device to determine that the wireless device is to switch from the assumption of the first scheduling delay to the assumption of the second scheduling delay in response to an explicit or implicit indication from a network node.

32. The wireless device of claim 31, wherein the explicit or implicit indication is an explicit indication comprised in downlink control information from the network node.

33. The wireless device of claim 30, wherein:

the processing circuitry is further configured to cause the wireless device to monitor, during the first slot, for a downlink control channel comprising downlink control information that schedules a transmission for the wireless device with the assumption of the first scheduling delay while the wireless device operates in a first power mode that is associated with the first scheduling delay; and in order to cause the wireless device to determine that the wireless device is to switch from the assumption of the first scheduling delay to the assumption of the second scheduling delay, the processing circuitry is further configured to cause the wireless device to transition from the first power mode to a second power mode associated with the second scheduling delay.

34. The wireless device of claim 33, wherein the processing circuitry is further configured to cause the wireless device to transition from the first power mode to the second power mode in response to an indication comprised in downlink control information from a network node.

* * * * *